(12) United States Patent
Saravis

(10) Patent No.: US 7,048,346 B2
(45) Date of Patent: May 23, 2006

(54) SNAP TOGETHER MODULAR STORAGE

(75) Inventor: Darren Saravis, Signal Hill, CA (US)

(73) Assignee: Cube Concepts LLC, Laguna Niguel, CA (US)

( * ) Notice: Subject to any disclaimer, the term of this patent is extended or adjusted under 35 U.S.C. 154(b) by 13 days.

(21) Appl. No.: 10/271,836

(22) Filed: Oct. 15, 2002

(65) Prior Publication Data
US 2003/0173875 A1    Sep. 18, 2003

Related U.S. Application Data

(63) Continuation-in-part of application No. PCT/US02/00946, filed on Jan. 11, 2002, and a continuation-in-part of application No. 09/759,898, filed on Jan. 3, 2001, now Pat. No. 6,557,955.

(51) Int. Cl.
F16B 12/00    (2006.01)

(52) U.S. Cl. ................... 312/111; 312/108; 312/263; 403/381; 403/403

(58) Field of Classification Search ........ 312/107–109, 312/111, 263, 265.5, 265.6; 403/381–382, 403/402–403; 52/581, 588.1, 589.1, 591.31, 52/592.1
See application file for complete search history.

(56)    References Cited

U.S. PATENT DOCUMENTS

| | | |
|---|---|---|
| 3,661,434 A | 5/1972 | Alster |
| 3,722,704 A | 3/1973 | Piretti |
| 3,836,218 A | 9/1974 | Hallal |
| 3,856,147 A | 12/1974 | Piretti |
| 4,192,562 A | 3/1980 | Bishoff et al. |
| 4,253,268 A * | 3/1981 | Mayr .................. 446/104 |
| 4,385,850 A | 5/1983 | Bobath |
| 4,470,647 A | 9/1984 | Bishoff et al. |
| 4,585,131 A | 4/1986 | Crossman et al. |
| 4,592,601 A | 6/1986 | Hlinsky et al. |
| 4,652,170 A | 3/1987 | Lew |
| 4,676,038 A | 6/1987 | Doyon et al. |
| 4,792,319 A * | 12/1988 | Svagerko ............. 446/104 |
| 5,039,127 A | 8/1991 | Föhl |
| 5,048,448 A | 9/1991 | Yoder |
| 5,137,485 A * | 8/1992 | Penner ................. 446/127 |
| 5,180,250 A | 1/1993 | Ferro |
| 5,398,366 A | 3/1995 | Bradley |
| 5,466,057 A | 11/1995 | Blankenburg |
| 5,466,058 A | 11/1995 | Chan |
| 5,472,365 A * | 12/1995 | Engel .................. 446/104 |
| 5,477,594 A | 12/1995 | LePage |
| 5,502,939 A | 4/1996 | Zadok et al. |
| 5,520,410 A | 5/1996 | Sun |
| 5,524,402 A | 6/1996 | Sykes |
| 5,570,941 A | 11/1996 | Röch |
| 5,570,971 A | 11/1996 | Rixen et al. |
| 5,638,973 A | 6/1997 | Dewey et al. |

(Continued)

FOREIGN PATENT DOCUMENTS

EP    0 333 463    9/1989

(Continued)

Primary Examiner—Lanna Mai
Assistant Examiner—Hanh V. Tran
(74) Attorney, Agent, or Firm—Greenberg Traurig LLP; Mark Krietzman; E. Nair Flores

(57)    ABSTRACT

A modular storage rack, display structural element or cube system formed by snap together panels with alignment guides, which may also support wheels, shelves, drawers and doors. The system is assemble-in-place and may shipped and displayed for sale in a flat pack.

26 Claims, 21 Drawing Sheets

U.S. PATENT DOCUMENTS

| | | |
|---|---|---|
| 5,647,181 A | 7/1997 | Hunts |
| 5,715,760 A | 2/1998 | Frascaroli et al. |
| 5,775,046 A | 7/1998 | Fanger et al. |
| 5,791,810 A | 8/1998 | Williams |
| 5,888,114 A | 3/1999 | Slocom et al. |
| 5,921,047 A | 7/1999 | Walker |
| 5,921,646 A | 7/1999 | Hwang |
| 6,050,657 A | 4/2000 | Hiltzman |
| 6,250,986 B1 * | 6/2001 | Sorensen .................... 446/127 |
| 6,260,488 B1 | 7/2001 | Yang et al. |
| 6,557,955 B1 | 5/2003 | Saravis |
| 6,669,036 B1 | 12/2003 | Yang et al. |
| 6,814,946 B1 | 11/2004 | Peddicord et al. |

FOREIGN PATENT DOCUMENTS

| | | |
|---|---|---|
| GB | 2 030 670 A | 9/1978 |
| JP | 1-247682 | 10/1989 |
| WO | WO 93/19641 | 10/1993 |

* cited by examiner

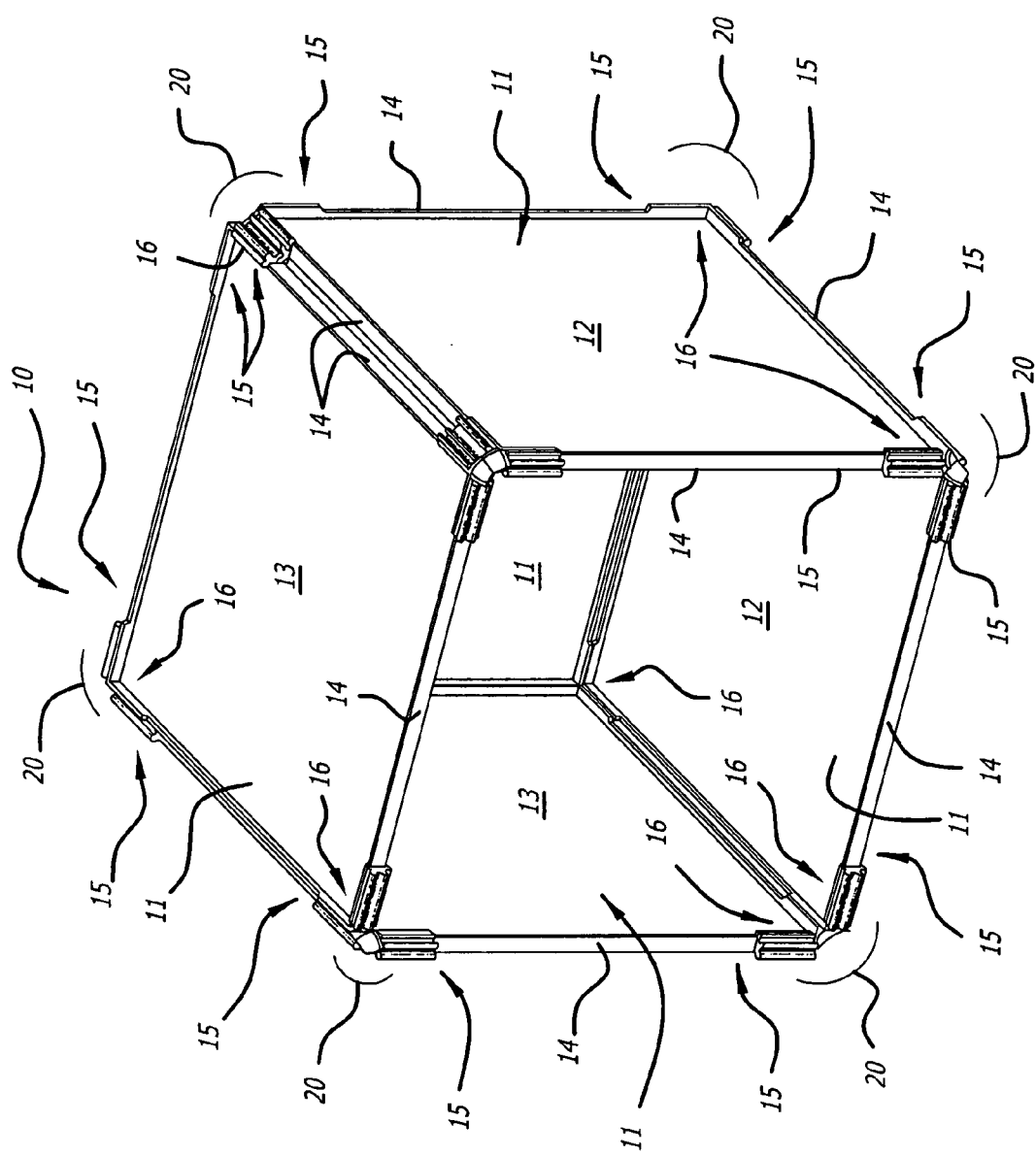

SNAP TOGETHER MODULAR STORAGE

RELATED APPLICATIONS

This application is a CIP of U.S. application Ser. No. 09/759,898, filed Jan. 3, 2001, now U.S. Pat. No. 6,557,955, entitled Assemble-in-Place Modular Storage and PCT application Serial No. PCT/US02/00946 filed Jan. 11, 2002 entitled Assemble-in-Place Modular Storage.

BACKGROUND OF THE INVENTION

1. Field of the Invention

This present invention relates to a novel assemble-in-place storage system. More specifically, to a snap-together method and system of panels, with interlocking edges, from which a variety of self-supporting, storage units, racks, display centers and cabinets may be constructed.

2. Related Art

Modular storage systems are useful to allow a user to customize a component system to fit his or her particular needs. Panel type storage whereby similar side panels are connected via edge members are found in U.S. Pat. No. 5,638,973 issued to Dewey et. al, and U.S. Pat. No. 5,466,058 issued to Chan. In both Dewey and Chan the containers may be stacked by placing a tab-like projection on the bottom edge of one part into a grove-like indentation in the top of another.

U.S. Pat. No. 5,888,114 issued to Slocum et. al., teaches a toy assembly or modular storage system which has a self-supporting edge element to it. The Slocum storage system is a series of similar panels, which form cubes via a slide together extruded mating edge with a catch running down the periphery of one edge and a latch running down the other side. Once two panels are latched in the slide-together fashion, the panel edges can only be disassembled by sliding them apart. Slocum illustrates a plethora of configurations for the slide-in catch and corresponding slide-in latch, all relying on an extruded latch and catch which teaches no alignment guides or stops to maintain the plumb alignment of connected panels. Slocum's slide together mating system connects 4 panels to form a four wall box.

A remaining challenge in the field of modular storage systems is to provide panels which can snap together at the edges. An additional challenge is to form snap together 5 or 6 sided structural elements and structures. The present invention overcomes such challenges and prior limitations by creating a snap-in latch and catch panel attachment.

SUMMARY OF INVENTION

The present invention is a modular storage system constructed of panels. Each panel has a front and a back side and four edges and four corners. On at least one edge, viewed from a front or a back side is found a latch/catch pair. The sequence of latch to catch is alternating around each side. The catch is elongated having adequate elasticity, memory and/or lubricity to deform and snap-back into place upon insertion or removal of the corresponding elongated latch. In some embodiments the latches are deformable and snap into a catch which may be substantially rigid or deformable.

Accordingly, a pair of oppositely oriented panels snap together at an edge forming a right angle between the two panels. Additional panels may be added to form structures such as racks, carts, desks and cubes. Each catch may also provide a stop to prevent the latch from sliding within the elongated catch and becoming misaligned. On the edges on each panel a buttress can be formed. Two adjacent buttresses support each other and act as a larger panel support which further stabilizes the structures constructed from the panels.

Latches and catches may be formed as part of each panel, on one or both sides. Latches and catches may be attached by slide-on, snap-on, glue mount or through mount at the appropriate locations on a panel. Advantages to attaching the latches and catches include combining dissimilar materials which are impossible or difficult to co-mold, such as a metal sheet, wood or metal grid panel affixed to the latches and catches. Hinged doors, latching hinged doors and wheels may also be added to a cube, panel or structure. Hinges may be supported on the panel covers and a closure catch, to receive a closure latch, may be combined with batches and/or catches. The panels may have protruding or recessed surface features which may form a support skeleton for a grid like panel and may be used to provide pathways or guides for shelves and/or drawers.

Non-cube structures with rectangular side panels may also be formed. Opposing interchangeable side panels can be used to form box-like structures with a multitude of varying dimensional opposing wall pairs.

The features of the invention believed to be novel are set forth with particularity in the appended claim. The invention itself, however, both as to configuration and method of operation, and the advantages thereof, may be best understood by reference to the following descriptions taken in conjunction with the accompanying drawings.

BRIEF DESCRIPTION OF THE DRAWINGS

FIG. 1A is a front perspective view of a modular storage system.

PREFERRED EMBODIMENTS OF THE INVENTION

Figure 1B:
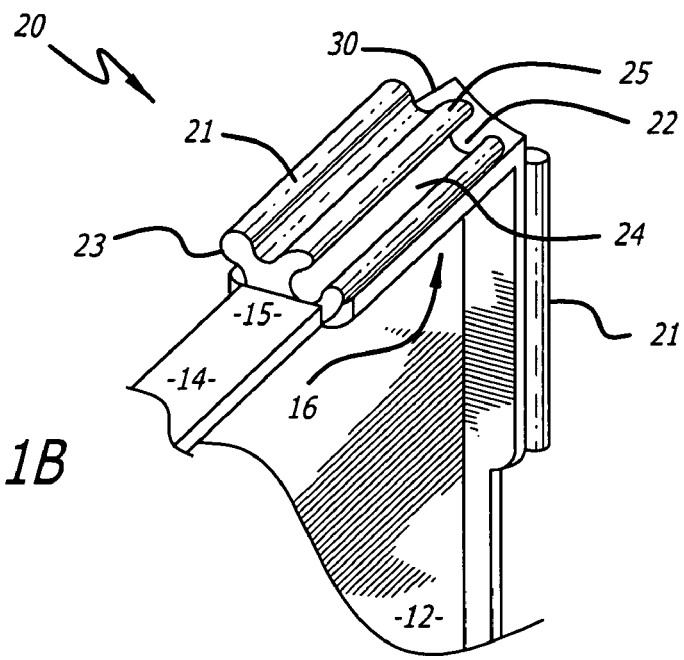
FIG. 1B is a front view of an unattached corner of one panel of the embodiment shown in FIG. 1A.

Shown in FIG. 1A is a front perspective view of a preferred embodiment, generally designated 10.

The cube is formed of five four sided panels 11. Each panel has a front 12 and a back side 13 face and an edge 14 at each side. At each end 15, of each edge 14, near the corners 16 of each panel 11, a latch/catch pair 20 is formed. Viewed from the edge 14, a latch 21 and a catch 22 are formed near the corner 16. The latch/catch pairs 20 are reversed such that on any given edge 15 of a panel 11 one latch 21 will be exposed on one side and one catch 22 will be exposed on the other side. This configuration allows alternating panels to be used to construct the entire structure.

Figure 1C:
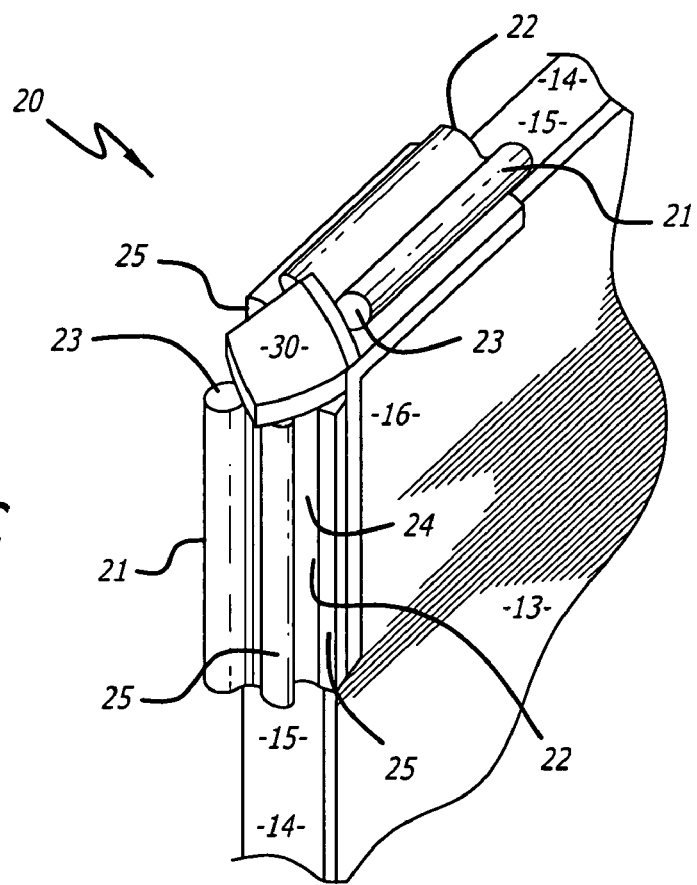
FIG. 1C is a rear view of an unattached corner of one panel of the embodiment shown in FIG. 1A.
Figure 1D:
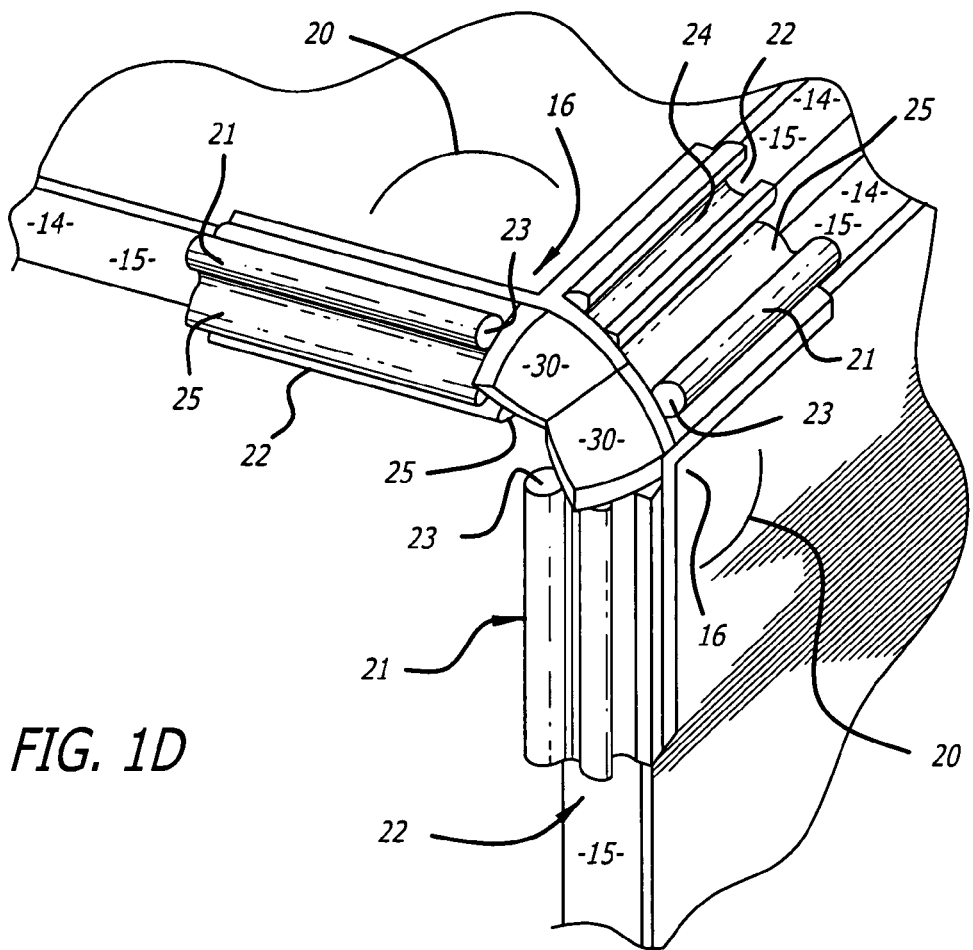
FIG. 1D is a perspective view of an attached front corner of the embodiment shown in FIG. 1A.

Shown in FIGS. 1B, 1C, 1D and 1E are front and rear perspective views of a corner of an unattached panel, a perspective view of an attached front corner and a cut away view of FIG. 1D at line A—A.

In FIGS. 1B & 1C the latches 21 shape is shown, the tab projection forming the latch is elongated with an enlarged head 23 at its distal end which reversibly snaps into the corresponding elongated catch 22 slot 24 and extends at approximately a 45 degree angle from the panel. The panels are preferably an injection molded part constructed out of acrylonitrile-butadiene-styrene "ABS", Acetal, Acylic or nylon. However, depending on the intended use, materials such as polycarbonate, polypropylene or polyurethane may be substituted. An alignment stop 30 is formed at the junction of each edge 14. The alignment stop 30 prohibits the type of movement common to latch/catch panels which are connected via an extruded latch or catch which mount together via a slide-in function. Additionally, as shown in FIG. 1D the alignment stops 30 form a buttress between panels enhancing the structural integrity of the structure.

Figure 1E:
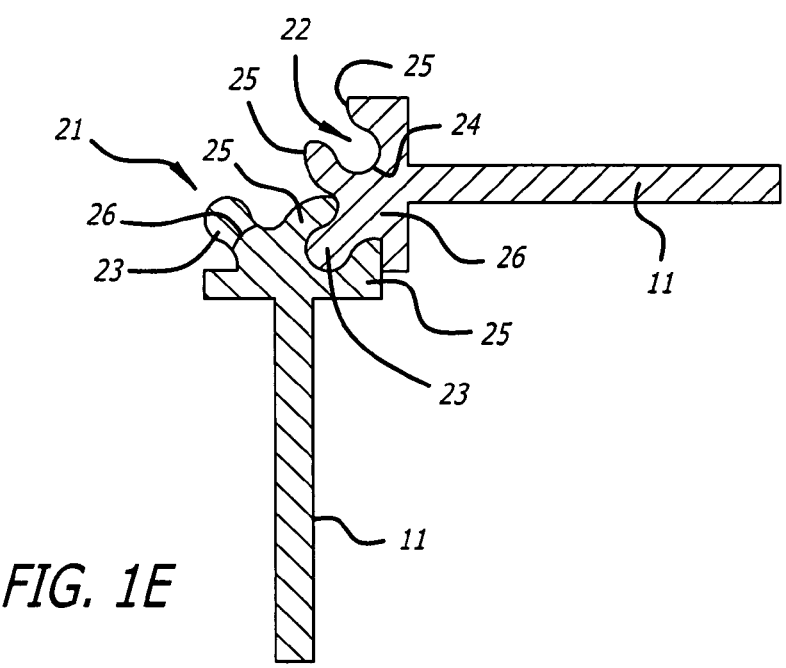
FIG. 1E is a cut-away side view along line A—A of FIG. 1D.

In FIG. 1E the enlarged head 23 forming the latch is shown mated firmly within the slot 24 of the catch 22, by constructing the catch 22 out of a material with sufficient lubricity, flexibility and/or memory, the enlarged head 23 may be withdrawn or snapped-out of the slot 24 by displacing the slot walls 25 which can snap-back, undamaged, upon withdrawal. A sufficiently flexible slot wall 25 also places less stress on the neck 26 of the latch 21 thereby minimizing the risk of neck damage during attachment or detachment of panels.

Figure 2A:
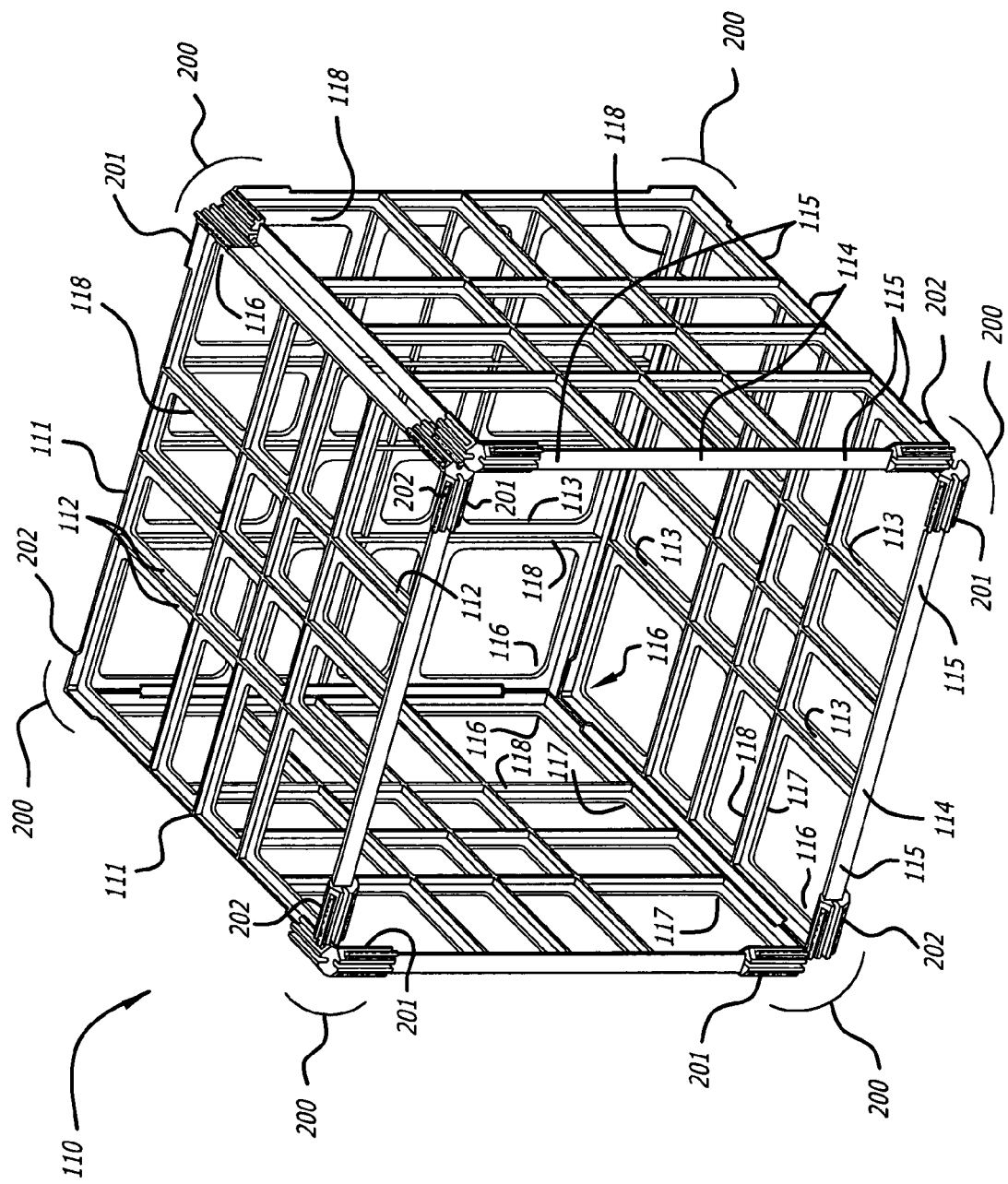
FIG. 2A is a front perspective view of another modular storage system.

Referring now to FIG. 2A there is illustrated a front perspective view of a first alternate embodiment of the modular storage system, generally designated 110.

The cube is formed of five square panels 111. Each panel 111 is a square frame with an open grid structure formed therein. Each panel has a front 112 and a back side 113 face and an edge 114 at each side. At each end 115, of each edge 114, near the corners 116 of each panel 111, a latch/catch pair 200 is formed. A panel grid 117 is formed within the boundary of the edges 114 and a raised grid support 118 may be extended from the panel grid to provide greater stability to the panel grid 117 and panel 111. Viewed from the edge 114, a latch 201 and a catch 202 are formed near the corner. The latch/catch pairs 200 are reversed such that on any given edge 114 of a panel 111 one latch 201 will be exposed on one side and one catch 202 will be exposed on the other side. This configuration allows similar alternating panels, with corresponding latch/catch pairs 200 to be used to construct the entire structure.

Variations in the side panels are anticipated and discussed within. Side panels may be constructed in a wide variety of forms, with different surface features, cut-outs, skeletal structures, protrusions and the like without departing form the intended scope of the invention.

Figure 2B:
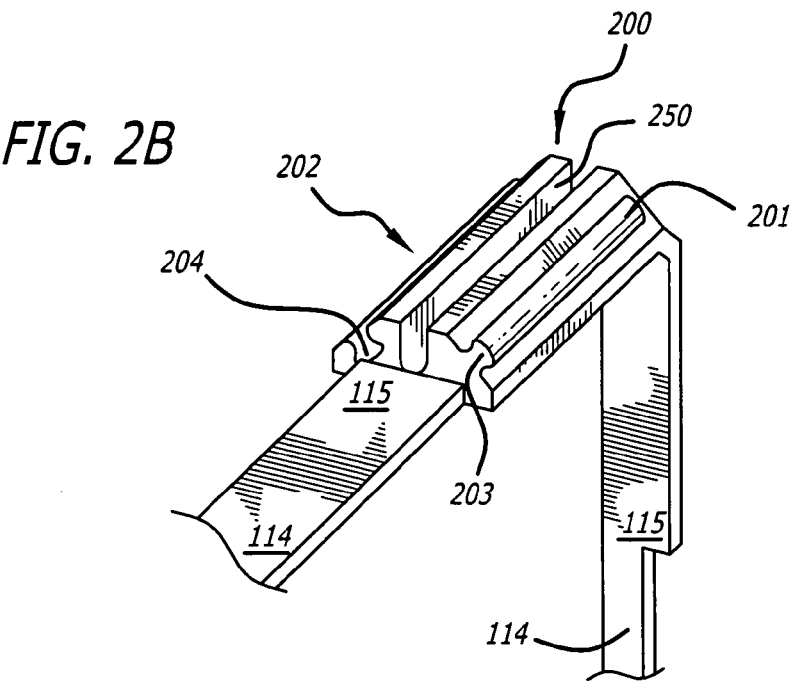
FIG. 2B is a front view of an unattached corner of one panel of the embodiment of FIG. 2A.
Figure 2C:
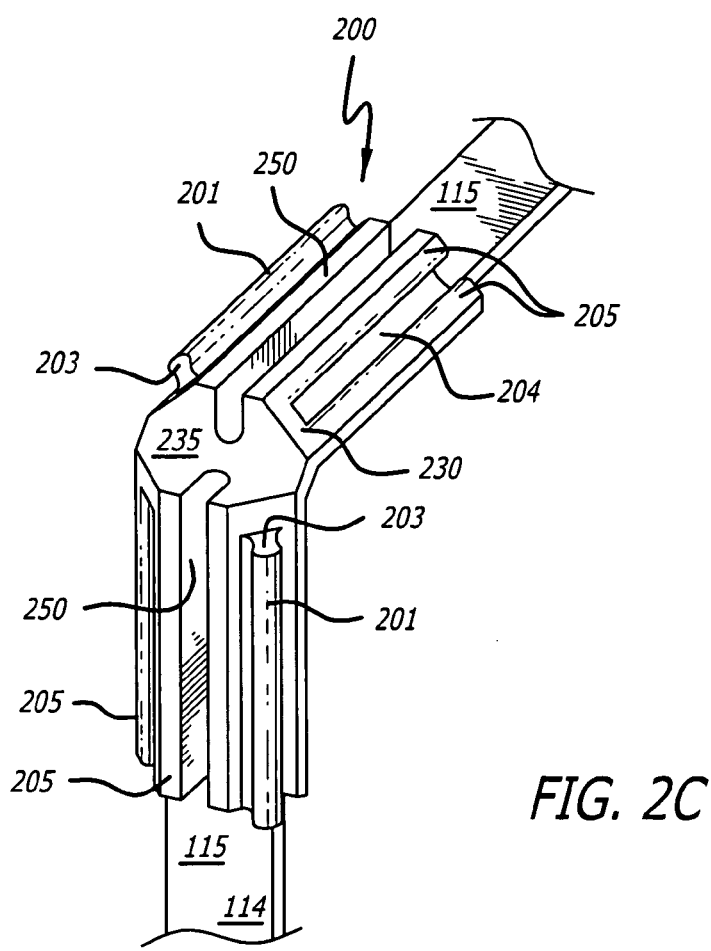
FIG. 2C is a rear view of an unattached corner of one panel of the embodiment of FIG. 2A.
Figure 2D:
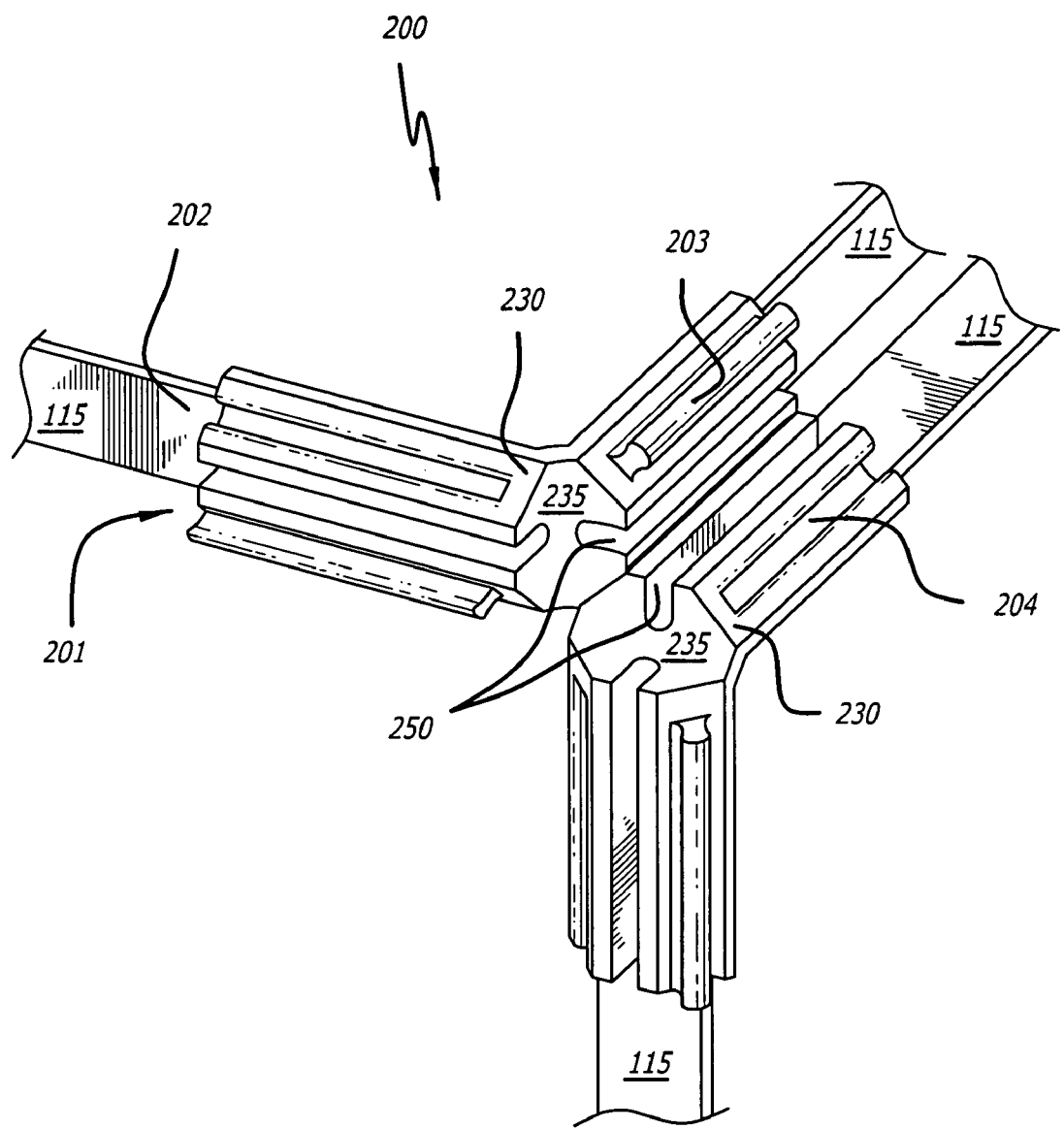
FIG. 2D is a blow-up of a front corner connection of the embodiment of FIG. 2A.
Figure 2E:
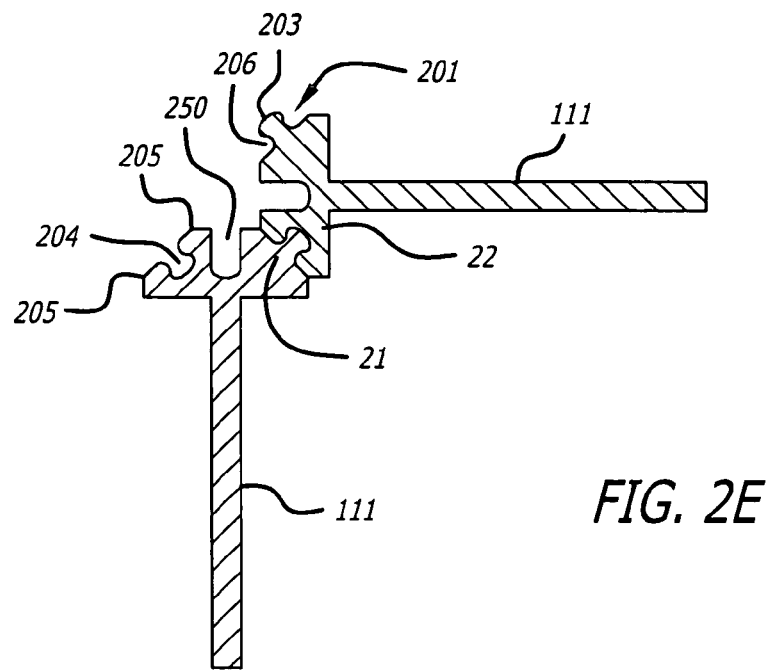
FIG. 2E is a cut-away side view along line A—A of FIG. 2C.

Shown in FIGS. 2B, 2C, 2D and 2E are a front and rear perspective view of a corner of an unattached panel, a perspective view of an attached front corner, a cut away view of FIG. 2D at line A—A, and a cut-away edge view of the intersection of four cubes.

In FIGS. 2B & 2C the latch 201 shape is illustrated, the tab projection forming the latch has a enlarged head 203 which snaps in a reversible fashion into the corresponding catch 202 slot 204. The panels are preferably an injection molded part constructed out of a material which is flexible and durable to provide for the snap-in and snap-out attachment such as polypropylene, ABS, polycarbonate or nylon. An alignment stop 230 is formed at the junction of each edge 114. The alignment stop 230, adjacent to an angular buttress 235, prohibits forward and back movement of a latch 201 within a catch 202. Additionally, the combination of two or more adjacent buttresses 235 (FIG. 2D) forms a larger panel support further enhancing the structural integrity of the structure.

Figure 2F:
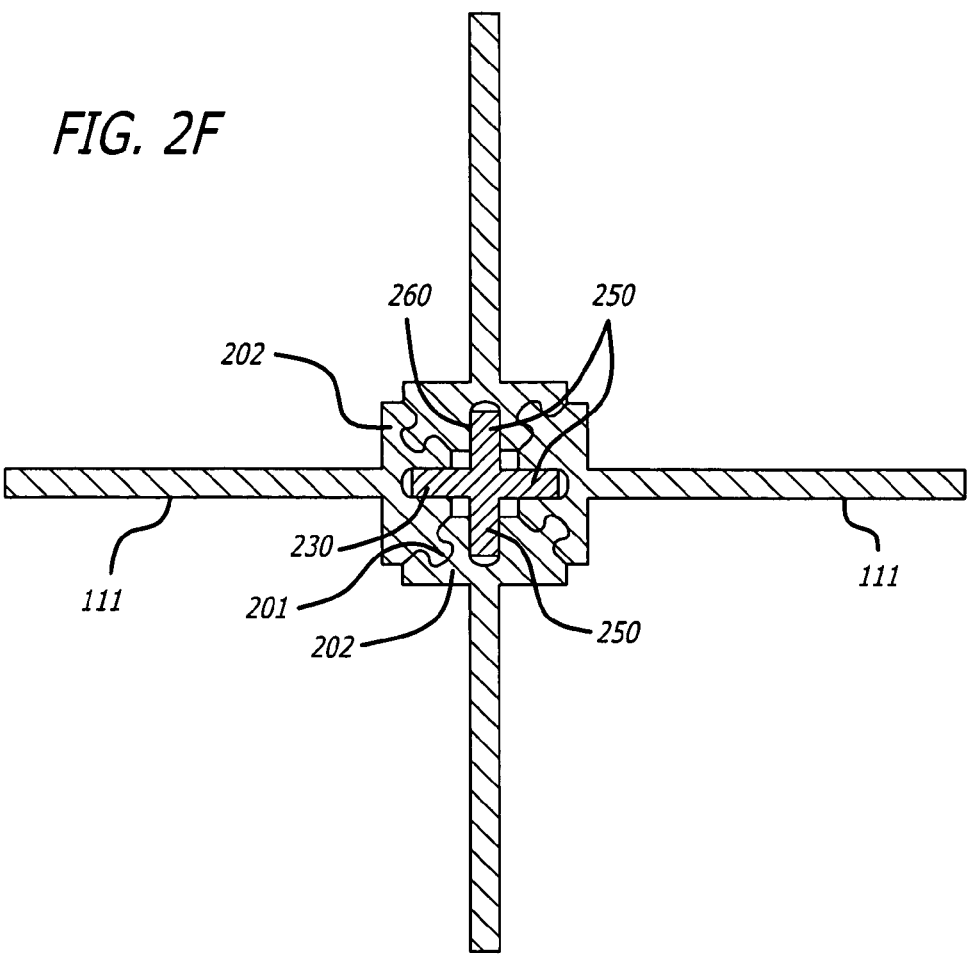
FIG. 2F is a cut-away edge view of the intersection of four cubes.

In FIG. 2D the enlarged head 203 forming the latch is shown mated firmly within the slot 204 forming the catch 202, by constructing the panels out of a material with sufficient flexibility, memory and/or lubricity the enlarged head 203 may be withdrawn or snapped-out of the slot 204 without damaging the slot walls 205 or the neck 206 of the latch 201. A support guide 250 is formed between the latch 201 and the catch 202. In FIG. 2F a support rod 260 of a size and shape to mate with the support guide 250 is shown. The support rod can be used to preclude removal of a panel when such action needs to be restricted, as may be the case with young children or in commercial, school or business locations.

Figure 3A:
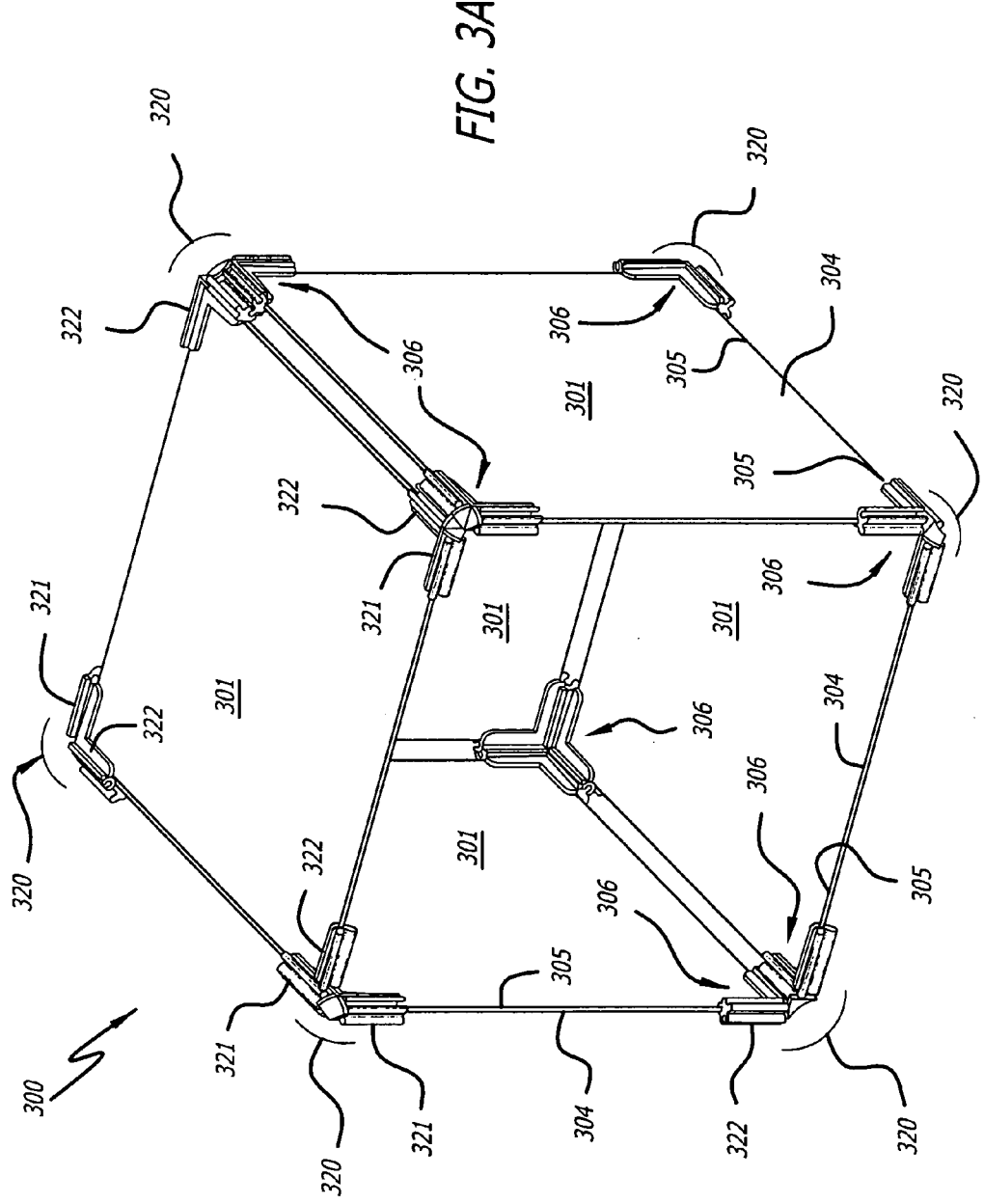
FIG. 3A is a front perspective view of another embodiment of a modular storage system.

FIG. 3A shows a front perspective view of a second alternate embodiment of the modular storage system, generally designated 300.

The cube is formed of five panels 301. Each panel 301 is of a similar size. Each panel side has an edge 304. At each end 305, of each edge 304, near the corners 306 of each panel 301, a slide-on corner panel cover 320 supporting latch/catch pairs 321/322 is affixed. Viewed from the edge 304, a slide-on corner panel cover 320 is attached near the corner 306. The latch/catch pairs 321/322 on the slide-on are reversed such that on any given edge 304 of a panel 301 one latch 321 will be exposed on one side and one catch 322 will be exposed on the other side. This configuration allows alternating panels to be used to construct the entire structure.

Figure 3D:
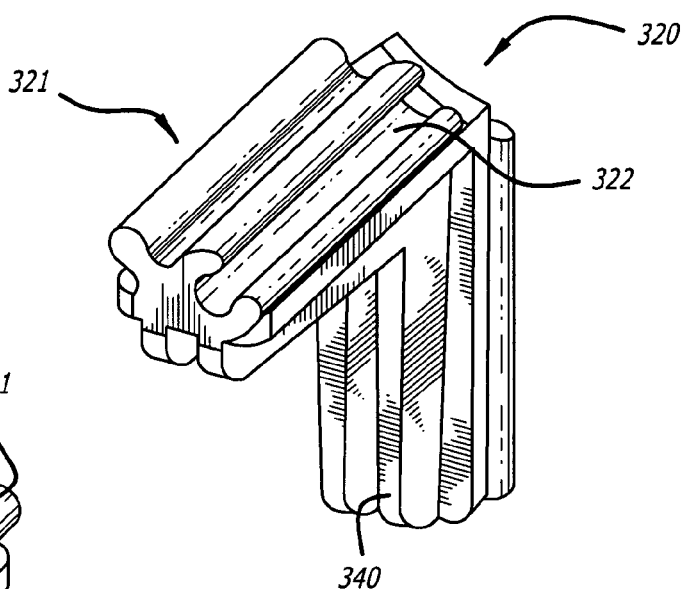
FIG. 3D is a blow-up rear perspective view of a slide-on corner panel cover of the embodiment of FIG. 3A.
Figure 3C:
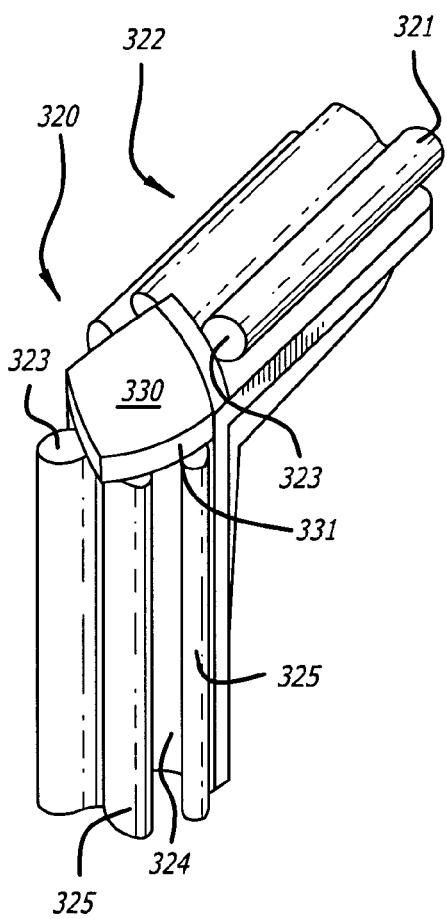
FIG. 3C is a blown-up front perspective view of the slide-on corner panel cover of the embodiment of FIG. 3A.
Figure 3B:
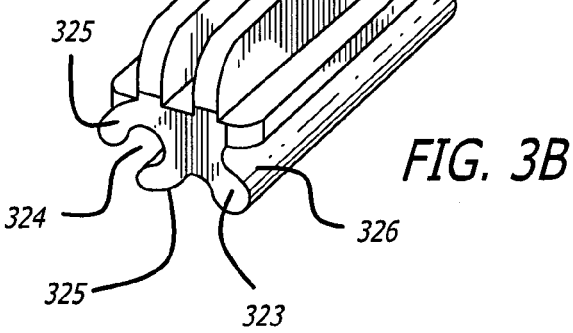
FIG. 3B is a blown-up back perspective view of a slide-on corner panel cover of the embodiment of FIG. 3A.
Figure 3E:
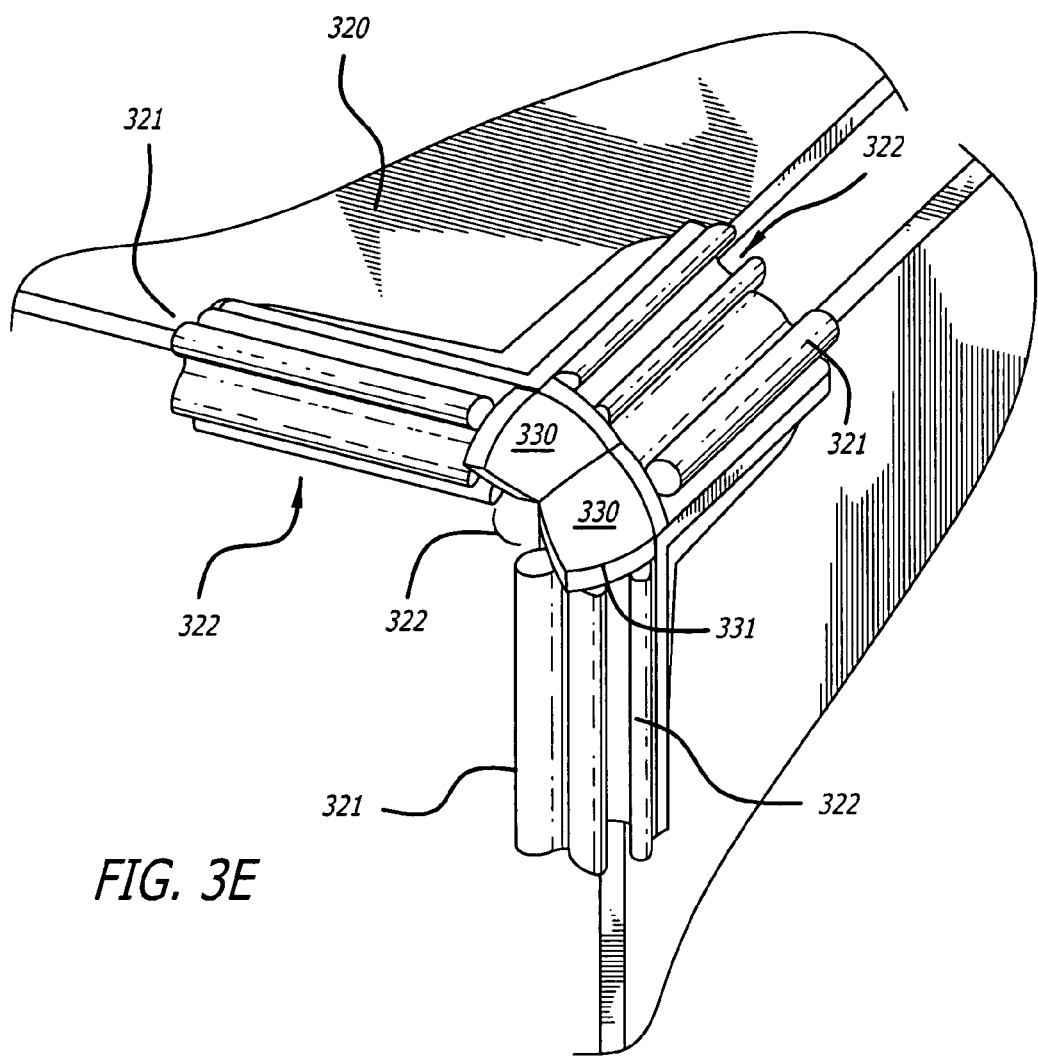
FIG. 3E is a blow-up of a front corner connection of the embodiment of FIG. 3A.

In FIGS. 3B, 3C, 3D, 3E and 3F, there is shown a front, back and rear perspective view of the slide-on corner panel cover 320, a perspective view of an attached front corner, a cut away view of FIG. 3E at line A—A, and a cut-away edge view of the intersection of four cubes.

In FIGS. 3B, 3C, and 3D the latch 321 shape is illustrated, the tab projection forming the latch is elongated and has a enlarged head 323 which snaps in a reversible fashion into the corresponding catch 322 slot 324. The slide on corner covers 320 are preferably an injection molded part constructed out of a material which is flexible and durable to provide for the snap-in and snap-out attachment such as polypropylene, ABS, polycarbonate, high durometer rubber, or nylon. An alignment stop 329 is formed at the corner junction of each latch/catch pair 321/322.

FIG. 3E illustrates the position of the alignment stops 329 which inhibits movement of a latch 321 within a catch 322 thereby enhancing the structural integrity of the structure. Surrounding each buttress 330 is a support edge 331 which engages the support edge 331 of a panel affixed adjacent and forms the larger support 332 at the corner. A panel mating guide 340 is formed opposite each latch/catch pair 321/322. It is via this panel mating guide 340 that each panel 301 is fitted into the slide-on corner cover 320. It is envisioned that each panel 301 will be solidly affixed to the panel mating guide 340. The nature of the attachment will be dependent on the material the panel is constructed of, adhesives, locking tabs, sonic welds, glue, rivets, crimping and the like may be used.

Variations in the side panels are anticipated and discussed within. A non-exclusive list of possible side panel materials are framed wire mesh, coated wire, plastic grids, wood, metal, plastic, composites, sheet steel (stainless, hot or cold rolled carbon steel, or any alloy), brass, or copper stamped or formed, woven metal or plastic and metal frames inserted molded into plastic.

Figure 3F:
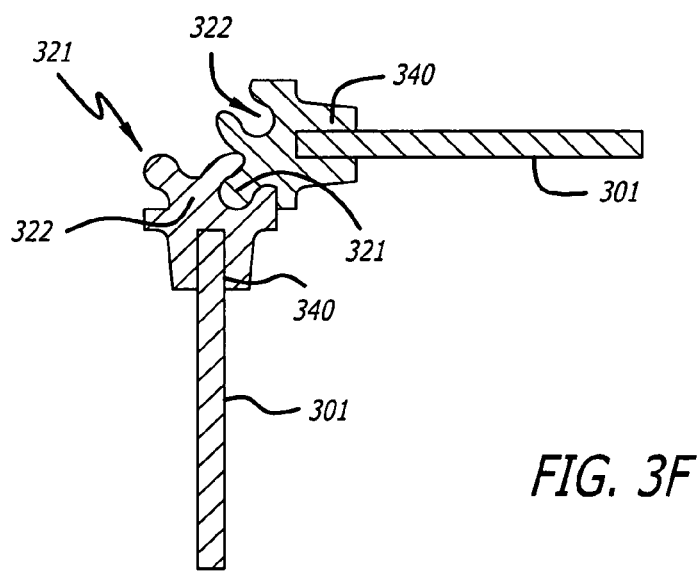
FIG. 3F is a cut-away side view along line A—A of FIG. 3E.

In FIG. 3F the enlarged head 323 forming the latch is shown mated firmly within the slot 324 forming the catch 322. By constructing the slide on corner covers 320 out of a material with sufficient lubricity the enlarged head 323 may be withdrawn or snapped-out of the slot 324 without damaging the slot walls 325 or the neck 326 of the latch 321.

Figure 4:
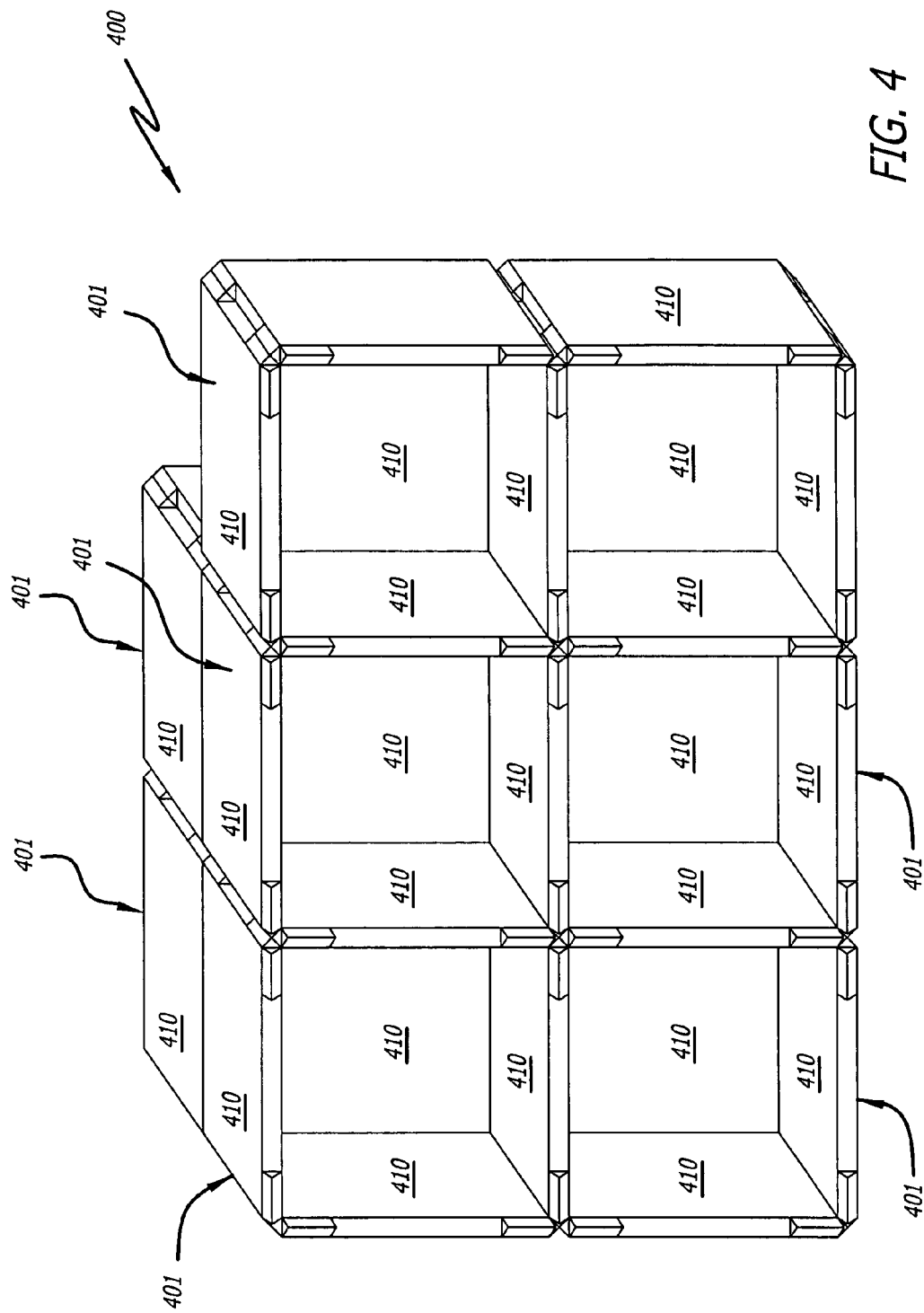
FIG. 4 is a perspective view of one arrangement of the connected panels.

Shown in FIG. 4 there is illustrated a perspective view of one arrangement of the connected panels, generally designated 400.

A series of cubes 401 are attached together with one panel 410 acting as a common panel shared between cubes 401. A latch/catch pair (as described in FIGS. 1–3) is found on opposite sides of each panel 410 to facilitate snap together construction of the cubes 401.

Figure 5A:
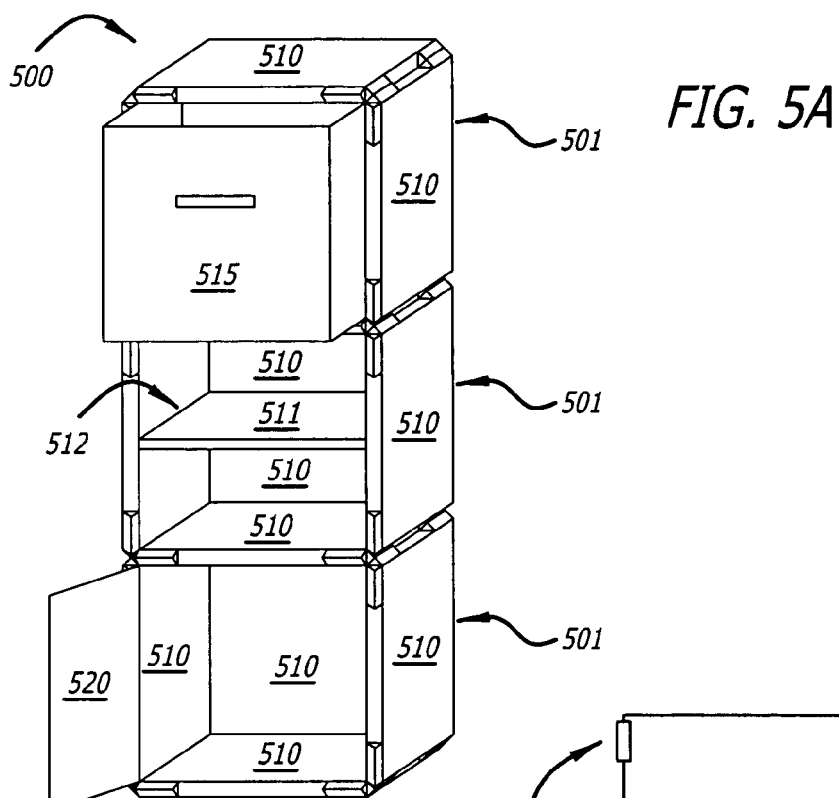
FIG. 5A is a perspective view of a second arrangement of the connected panels.
Figure 5B:
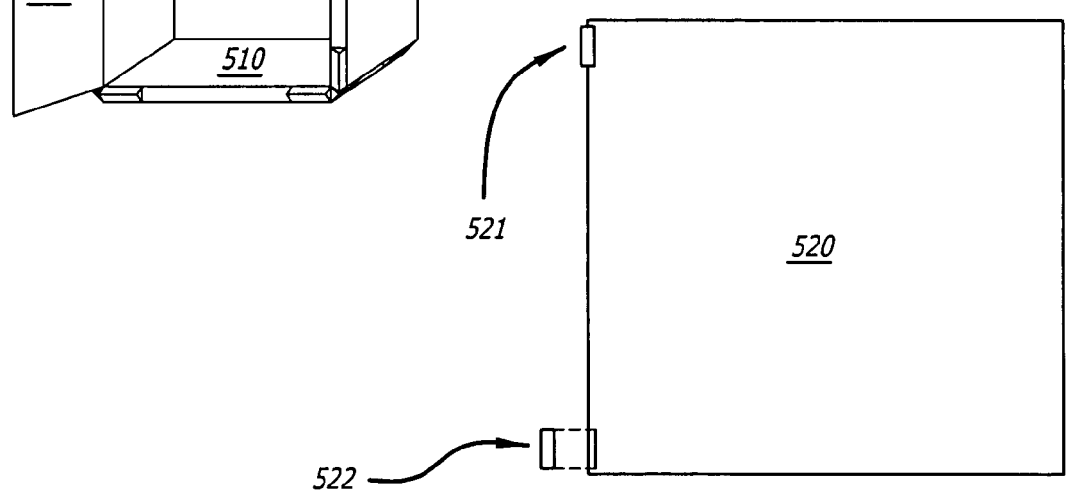
FIG. 5B is a component view showing the door and attachment to FIG. 5A.
Figure 5C:
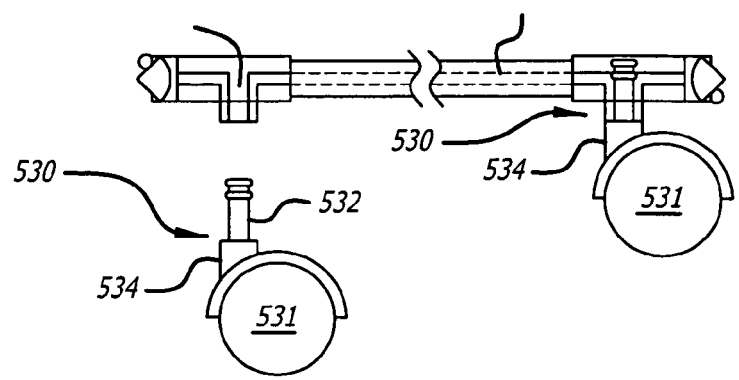
FIG. 5C is a component view showing the wheel and attachment to FIG. 5A.

Shown in FIGS. 5A, 5B and 5C there is a perspective view of a second arrangement of the connected panels, generally designated 500 forming a vertical storage case with wheels (FIG. 5C) and a swing door (FIG. 5B).

A series of cubes 501 are attached together (as described in FIGS. 1–4) constructed out of identical panels 510 forming a tower. A shelf member 511 is held within a guide 512 formed as part of the surface feature of the panels 510.

A hinged door 520 attaches to one of the cubes 501 via a hinge which has one latch 521 and one catch 522 (as described in FIGS. 1–3). A group of removable caster-type wheel modules 530 are affixed one per bottom corner, to the tower 500. Each wheel module 530 has one wheel 531 and rod 532, which mates with a boss 533 formed in each corner of the bottom panel 510. Each rod 532 extends from a wheel stop 534 and mates with the boss 533.

Figure 6:
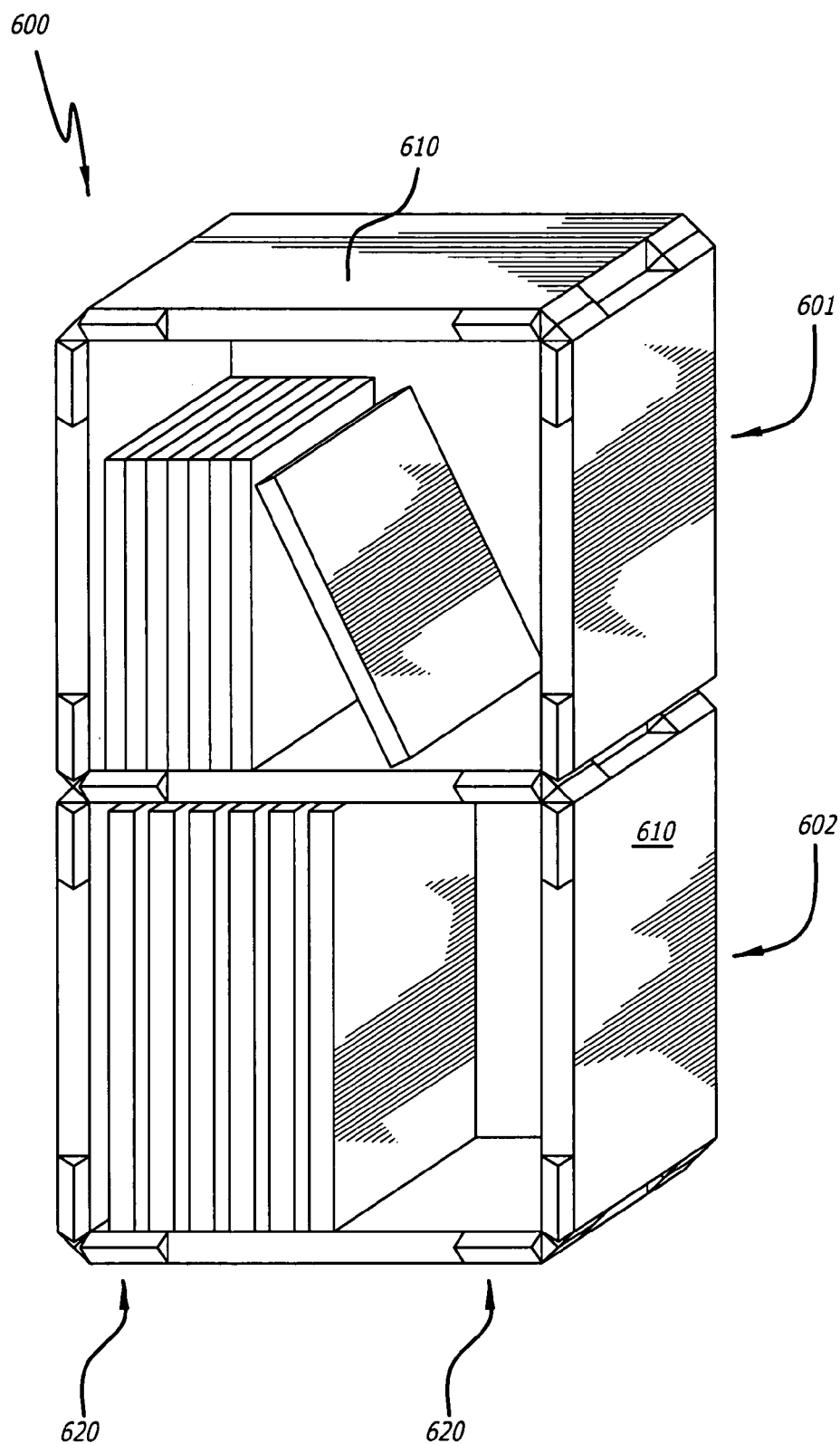
FIG. 6 is a perspective view of a third arrangement of the connected panels.

Shown in FIG. 6 there is a perspective view of a third arrangement of the connected panels, generally designated 600.

A series of cubes 601 are attached together (as described in FIGS. 1–4) constructed out of panels 610 forming a tower. In the configuration the cubes 601 are of a scale for desktop use to hold pads, paper, pens, clips, computer disks, CDs or other media storage devices. A series of rubber pads 620 may be affixed to the bottom surface of the lower cube 601 to inhibit slippage on a desktop.

Figure 7:
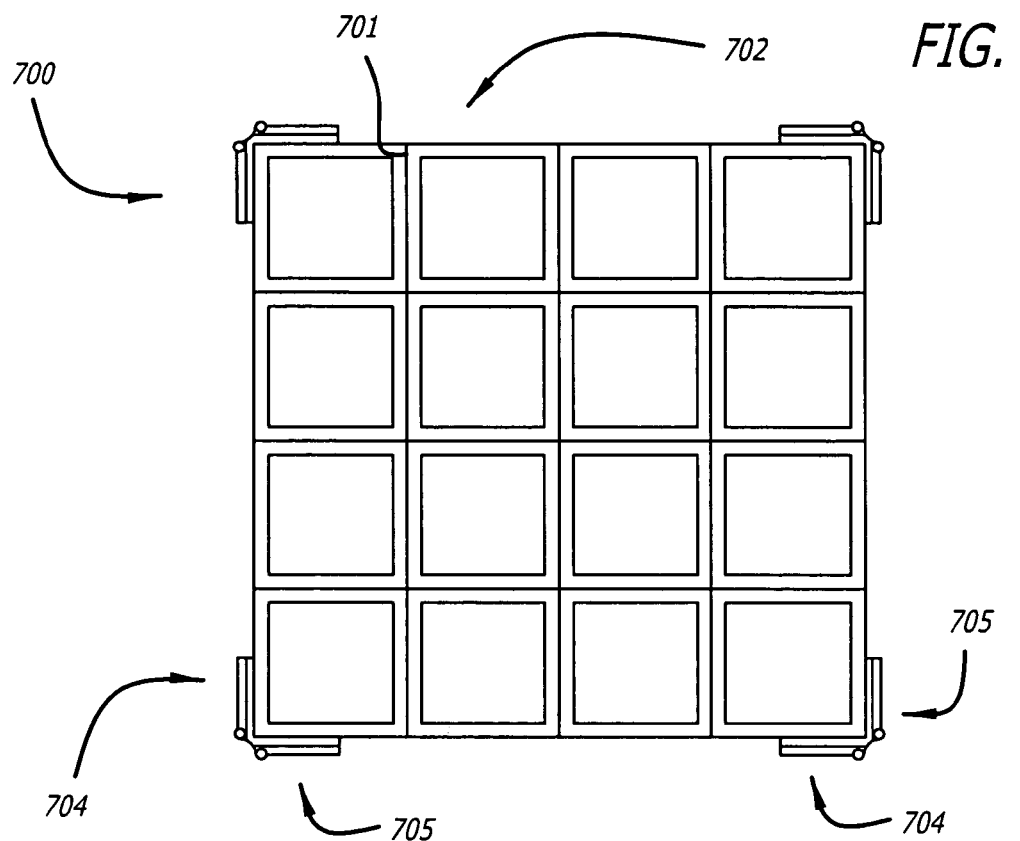
FIG. 7 is a front view of another panel embodiment.
Figure 8:
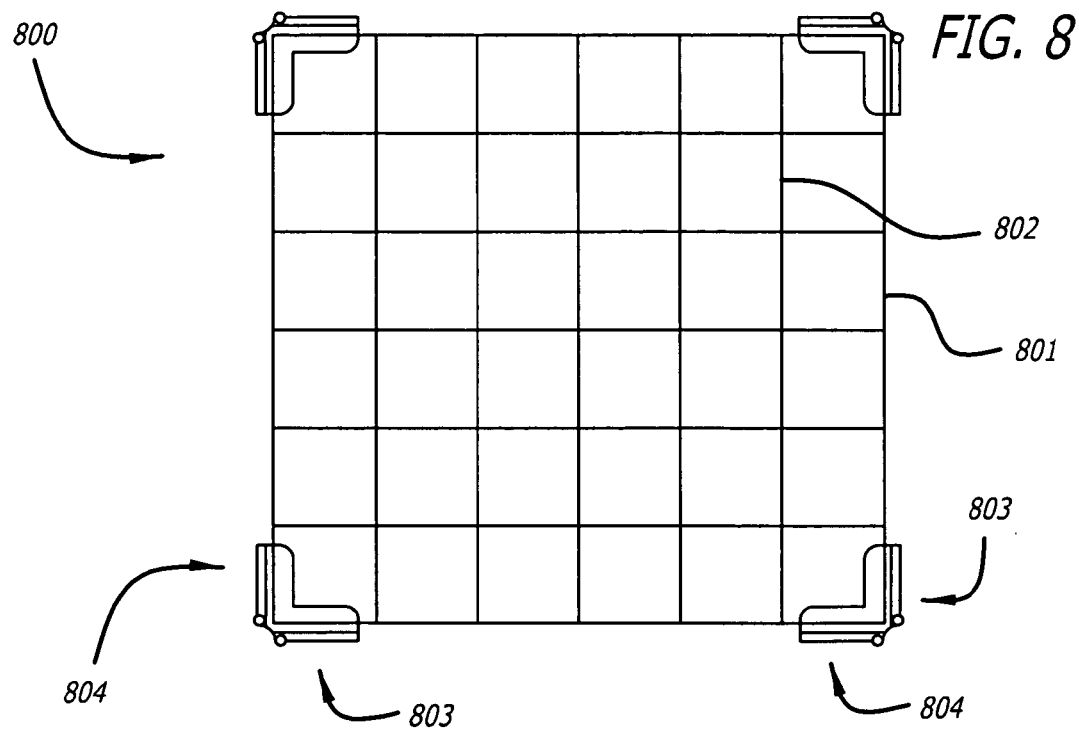
FIG. 8 is a front view of another panel embodiment.

Shown in FIGS. 7 & 8 there are front views of a first and second alternate panel embodiments generally designated 700 & 800, respectively.

In FIG. 7 there is a metal and plastic panel which has a wire insert 701 embedded within a preferably clear or translucent plastic structure 702, within a four sided square frame 703. On opposite ends of each side of the square frame 703 a latch 704 and a catch 705 (as previously described in FIGS. 1–3) are affixed, or formed as a part thereof. On the back face (not shown) of the panel 700 opposite each latch 704 is a catch 705 and opposite each catch 705 is a latch 704.

In FIG. 8 a square four-sided frame panel 801 supports a central mesh 802 affixed at opposite ends of each side of the square frame panel 801 is a latch 803 and a catch 804 (as previously described in FIGS. 1–3). On the back face (not shown) of the panel 800 opposite each latch 803 is a catch 804 and opposite each catch 804 is a latch 803. The square frame 801 and/or the mesh 802 may be constructed of plastic, metal or metal coated with a rubber-like material, lacquered, painted or metal plated.

Figure 9A:
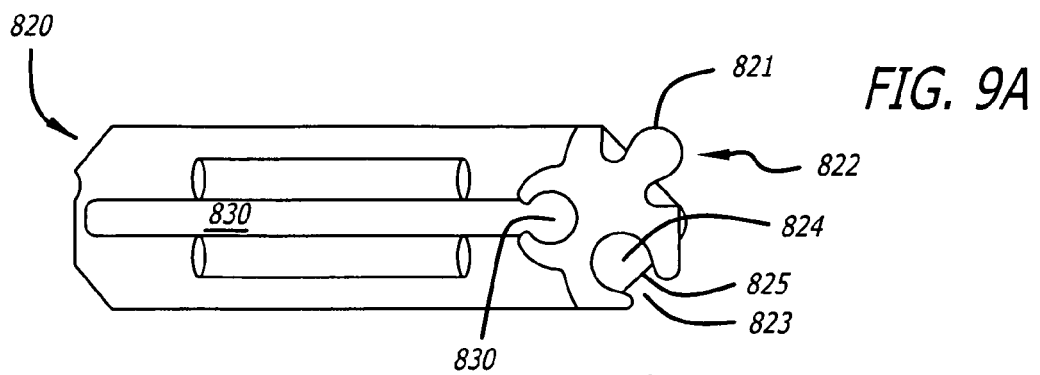
FIG. 9A is a end view of a snap-on panel cover attachment.
Figure 9B:
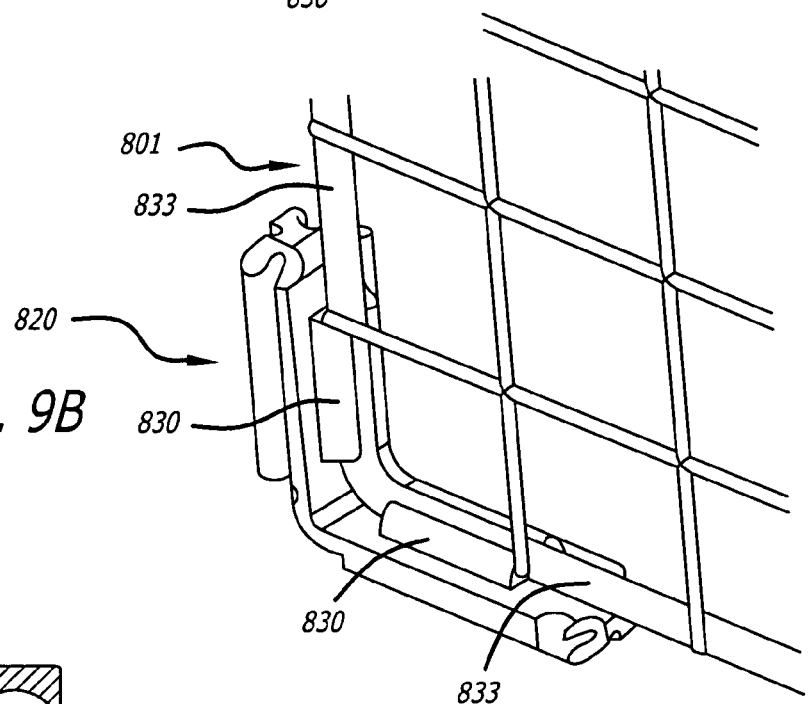
FIG. 9B is a partial view of a panel cover snapped on to a grid panel.

In FIGS. 9A and 9B another panel cover 820 is shown. The latch 821 is a tab projection with an enlarged head 822 which snaps in a reversible fashion into the corresponding catch 823 slot 824. The panel cover 820 is preferably an injection molded part constructed out of a material which is flexible and durable to provide for the snap-in and snap-out attachment such as polypropylene, ABS, polycarbonate, high durometer rubber, or nylon. An alignment stop 825 is formed on the panel cover 820.

Figure 9C:
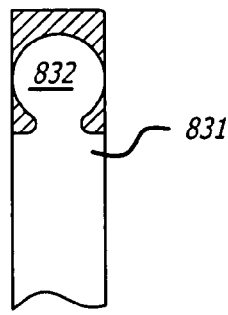
FIG. 9C is a cutaway view of a solid panel adapted to attach to the panel cover of FIG. 9A.

A snap-in panel mating guide 830 is formed opposite each latch/catch pair 821/823. It is via this snap-in panel mating guide 830 that a square frame panel 801, or other as shown in FIG. 9C, a solid panel 831, can be fit into the panel cover 820. The square frame panel 801 preferably has a circular section 833 for the frame of a size that can be snapped into the snap-in panel mating guide 830. A solid panel 831 can be attached to the panel cover via an attachment head 832 which is of a size that can be snapped into the snap-in panel mating guide 830.

Figure 10:
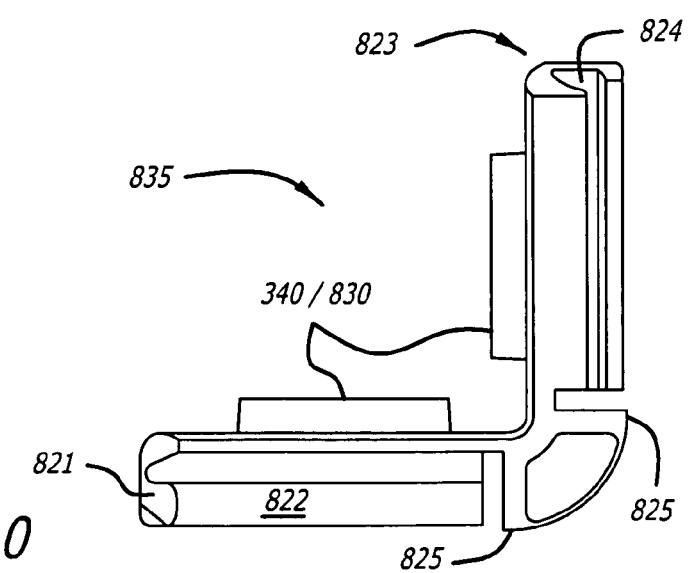
FIG. 10 is a top view of another embodiment of a slide-on corner panel cover.

In FIG. 10 another panel cover 835 is shown. The panel cover is a variation of the panel cover shown in FIG. 9. The latch 821 is a tab projection with an enlarged head 822 which snaps in a reversible fashion into the corresponding catch 823 slot 824. The corner cover 835 is preferably an injection molded part constructed out of a material which is flexible and durable to provide for the snap-in and snap-out attachment such as polypropylene, ABS, polycarbonate, high durometer rubber, or nylon which provides flexibility and durability. An alignment stop 825 is also formed thereon.

A slide-in panel mating guide 340 or a snap-in panel mating guide 830 can be formed opposite each latch/catch pair 821/823. The panel mating guide 340/830 is used to hold a panel into the panel.

Figure 11A:
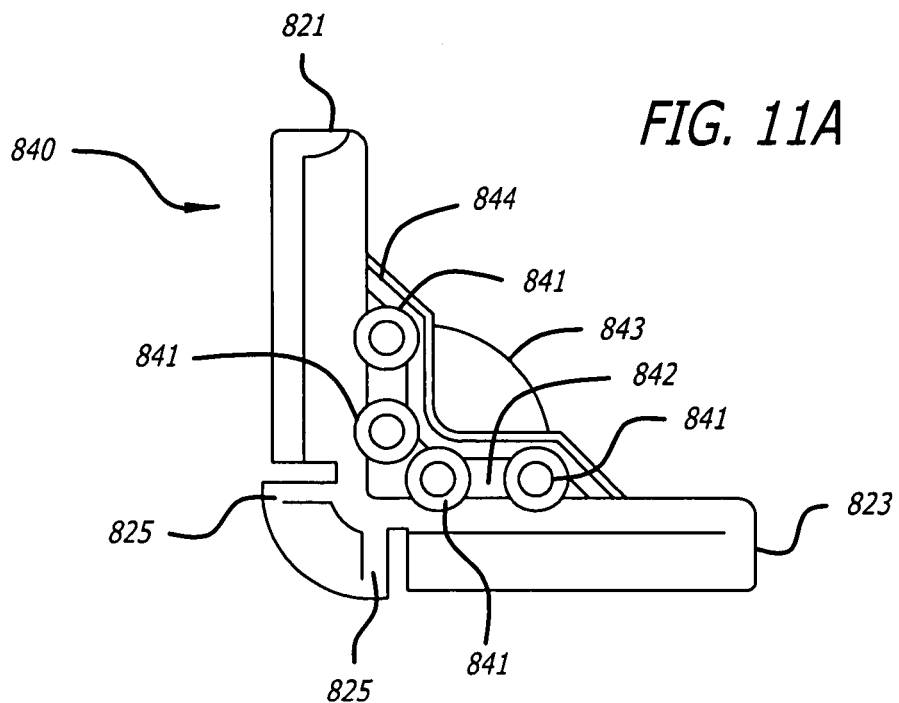
FIG. 11A is a top view of a through mount panel cover.

In FIG. 11A another panel cover 840 is shown. This panel cover has one latch 821 and one catch 823 and has a through-mount attachment. The latch 821 is a tab projection with an enlarged head which snaps in a reversible fashion into the slot of the corresponding catch 823. The panel cover 835 is preferably an injection molded part constructed out of out of a material which is flexible and durable to provide for the snap-in and snap-out attachment such as polypropylene, ABS, polycarbonate, high durometer rubber, or nylon. An alignment stop 825 is formed at the corner junction of each latch/catch pair 821/823.

With the mount guides 841, formed through a mounting plate 842, the panel cover 840 can be mounted to a panel (shown generally in FIG. 12A) with an attachment fastener, a non-exclusive list of fasteners which may be suitable include nails, rivets, screws, nuts and bolts, pins, swaged connectors, and barbed connectors. The corner cover 840 mounting plate 842 can also be used to form a receiving catch 843 for a latch closure. An extended lip 844 may be added to the receiving catch to provide an edge to hold a latch closure.

The illustration of four mount guides 841 is not a limitation or requirement. The number, size and placement of mount guides 841 is dependant on the any number of factors which include, but are not limited to, the type of panel material the panel cover 840 is to be through mounted to, whether the corner cover will also support a hinge (as shown in FIG. 12), whether the mounting plate 842 is used as a closure catch (shown in FIG. 12), or whether the mounting plate 842 is used to support a top (shown in FIG. 13).

Figure 11B:
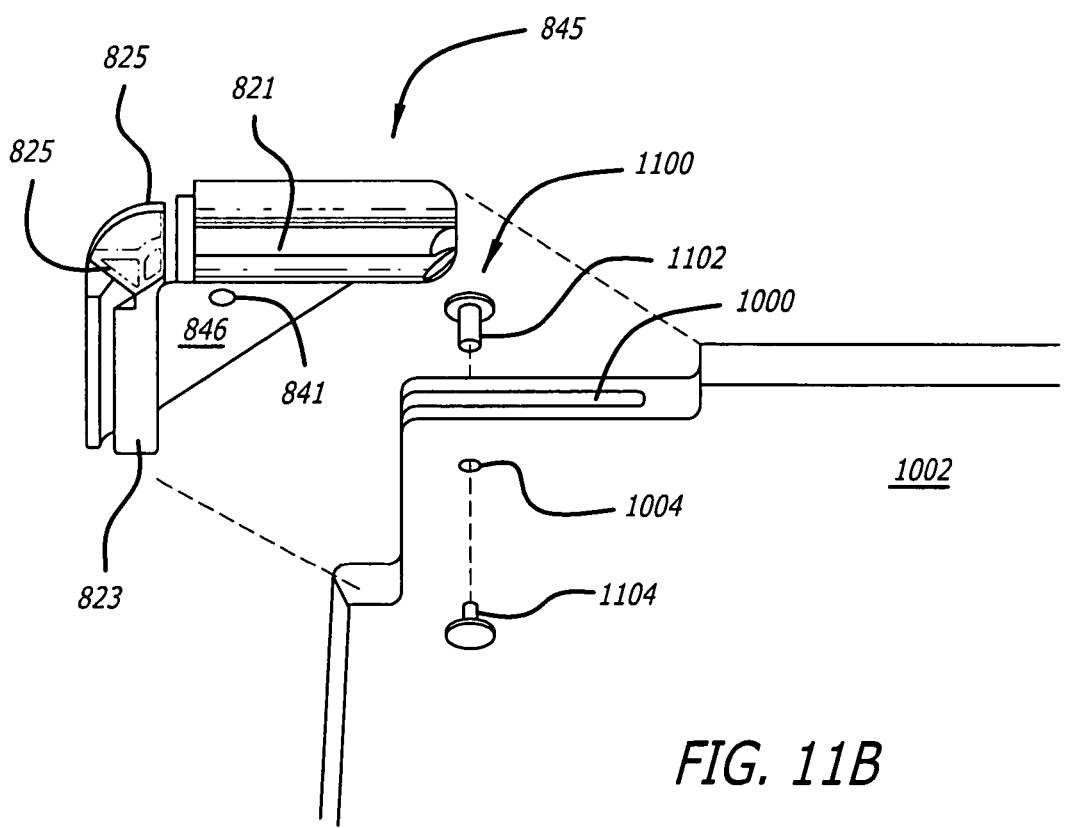
FIG. 11B is a perspective view of another through mount panel cover.

In FIG. 11B another panel cover 845 is shown. This panel cover has one latch 821 and one catch 823 and has a through-mount attachment. The latch 821 is a tab projection with an enlarged head which snaps in a reversible fashion into the slot of the corresponding catch 823. The panel cover 845 is preferably an injection molded part constructed out of a material which is flexible and durable to provide for the snap-in and snap-out attachment such as polypropylene, ABS, polycarbonate, high durometer rubber, or nylon. An alignment stop 825 is formed at the corner junction of each latch/catch pair 821/823.

The mount guide 841, formed through the mounting plate 846, is used to hold the mounting plate 846 within a support slot 1000 at the corner of a panel 1002. The illustration of a single mount guide 841 is not a limitation or requirement. The panel cover 845 is held within the support slot 1000 with a fastener. In this embodiment the fastener 1100 is constructed of a two piece connector 1102 and 1104 which is inserted through a fastener guide 1004 within the panel 1002. A non-exclusive list of fasteners which may be suitable include nails, rivets, screws, nuts and bolts, pins, swaged connectors, and barbed connectors.

Figure 11C:
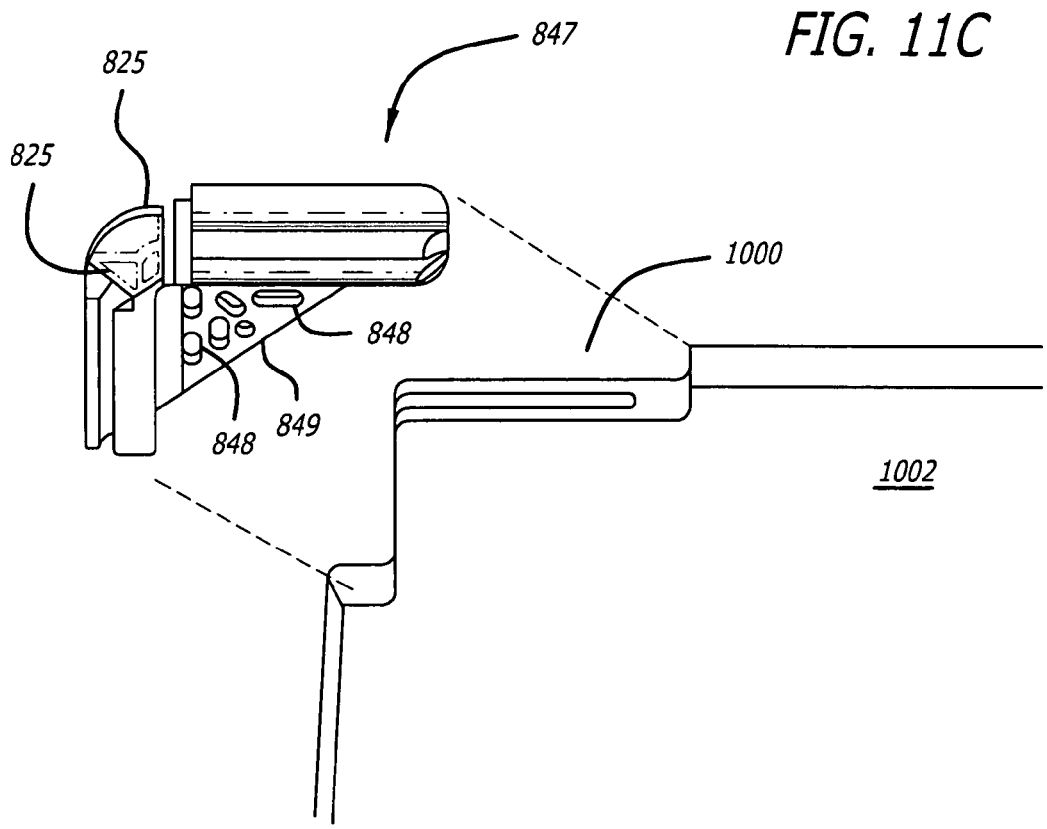
FIG. 11C is a perspective view of another glue mount panel cover.

In FIG. 11C another panel cover 847 is shown. This panel cover has one latch 821 and one catch 823 and has a through-mount attachment. The latch 821 is a tab projection with an enlarged head which snaps in a reversible fashion into the slot of the corresponding catch 823. The panel cover 847 is preferably an injection molded part constructed out of a material which is flexible and durable to provide for the snap-in and snap-out attachment such as polypropylene, ABS, polycarbonate, high durometer rubber, or nylon. An alignment stop 825 is formed at the corner junction of each latch/catch pair 821/823.

Glue mount attachment guides 848 formed through the mounting plate 849, into which glue or adhesive can flow through prior to curing, are used to adhere and/or fix the panel cover 847 to the panel 1002. The mounting plate 849 nests within the support slot 1000 at the corner of the panel 1002. The number size and shape of glue mount attachment guides 848 is not a limitation or requirement.

The panel cover 847 is held within the support guide 1000 by a glue or adhesive (not shown) added to the support guide and/or the mounting plate 849 and the glue mount attachment guides 848.

Figure 12B:
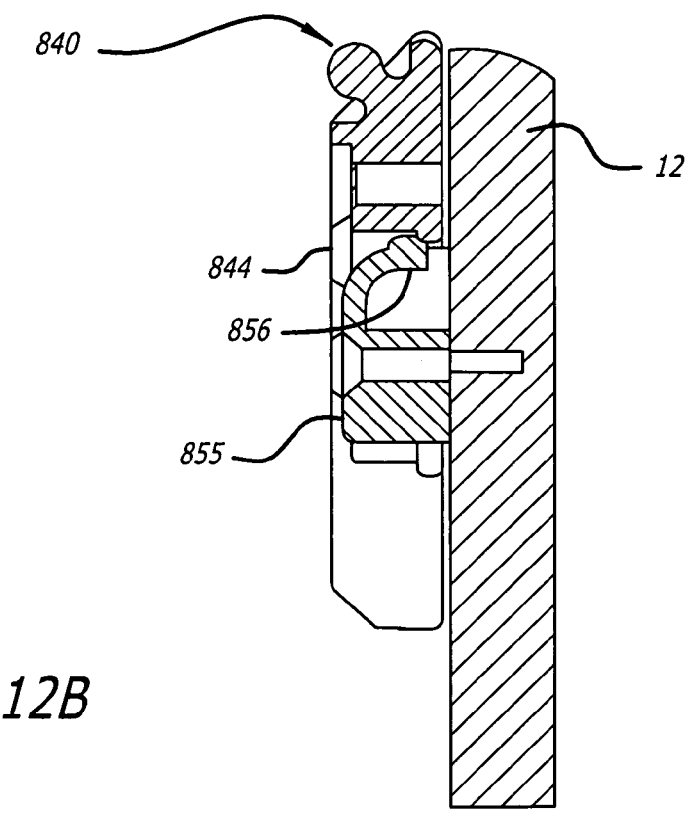
FIG. 12B is a cutaway side view of the door latch closure in the receiving latch of the embodiment in FIG. 12A.
Figure 12A:
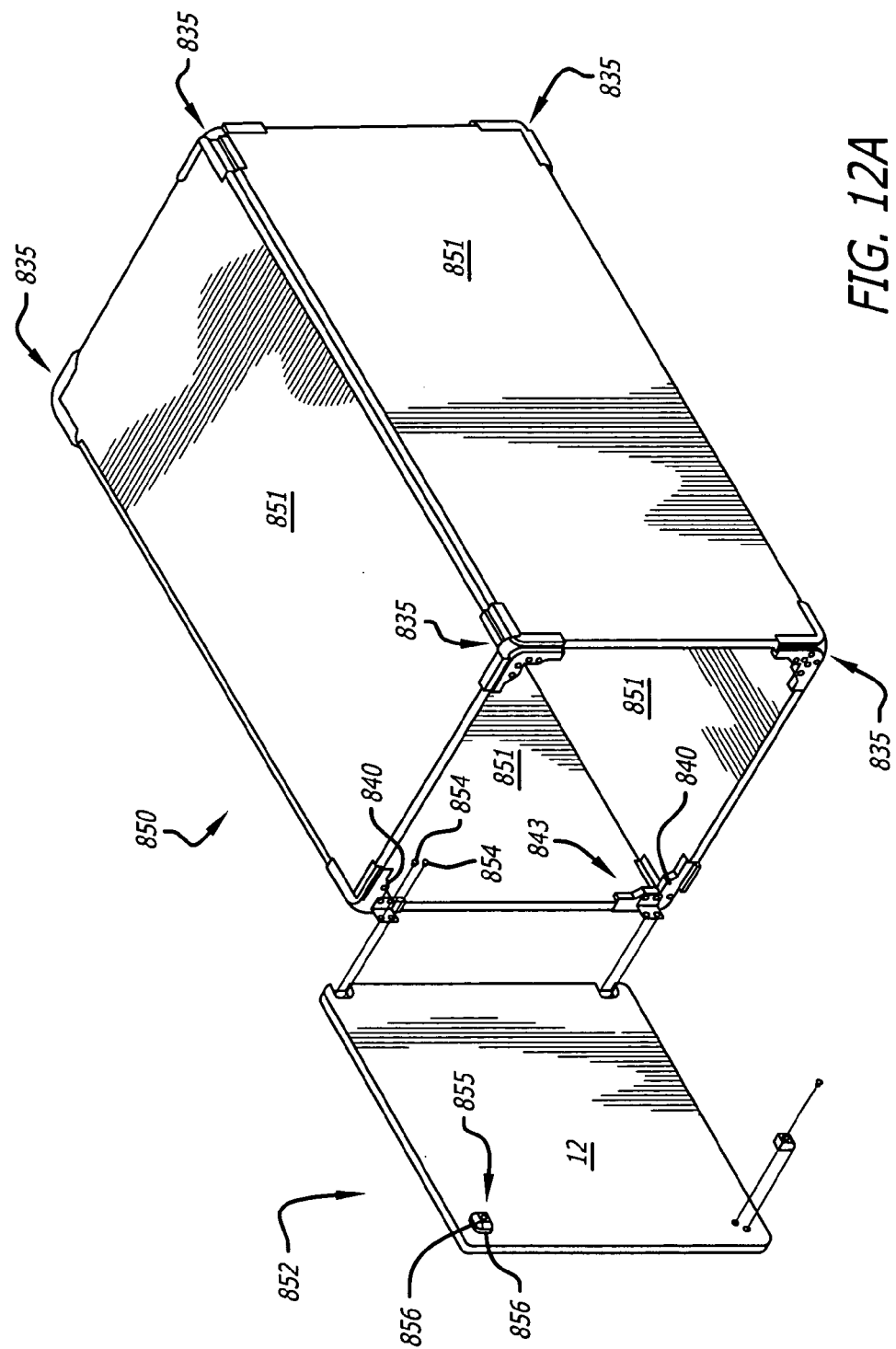
FIG. 12A is an assembly view of an arrangement of panels.

Shown in FIGS. 12A and 12B there is illustrated an assembly view and cutaway view of one arrangement of connected panels, generally designated 850.

A non-cube box is formed by connecting rectangular panels 851 via the panel covers 855 and utilizing a square panel 12 to form a hinged door 852. A pair of hinges 853 can be mounted to panel covers 840 via the through-mount guides (See FIG. 11) fastened to the hinged door 852 via fasteners 854. The panel cover 840 mounting plates 842 to which the hinges 853 are mounted also provide the receiving catch 843 (shown in FIG. 11) with extended lip 844 for the latch closures 855. The latch closures 855 have one or more flexible regions 856 which deform to fit into the receiving catch 843 thereby holding the hinged door shut. FIG. 12B shows a latch closure 855 in a receiving latch 843 with the extended lip 844 holding the closure 855.

Figure 13A:
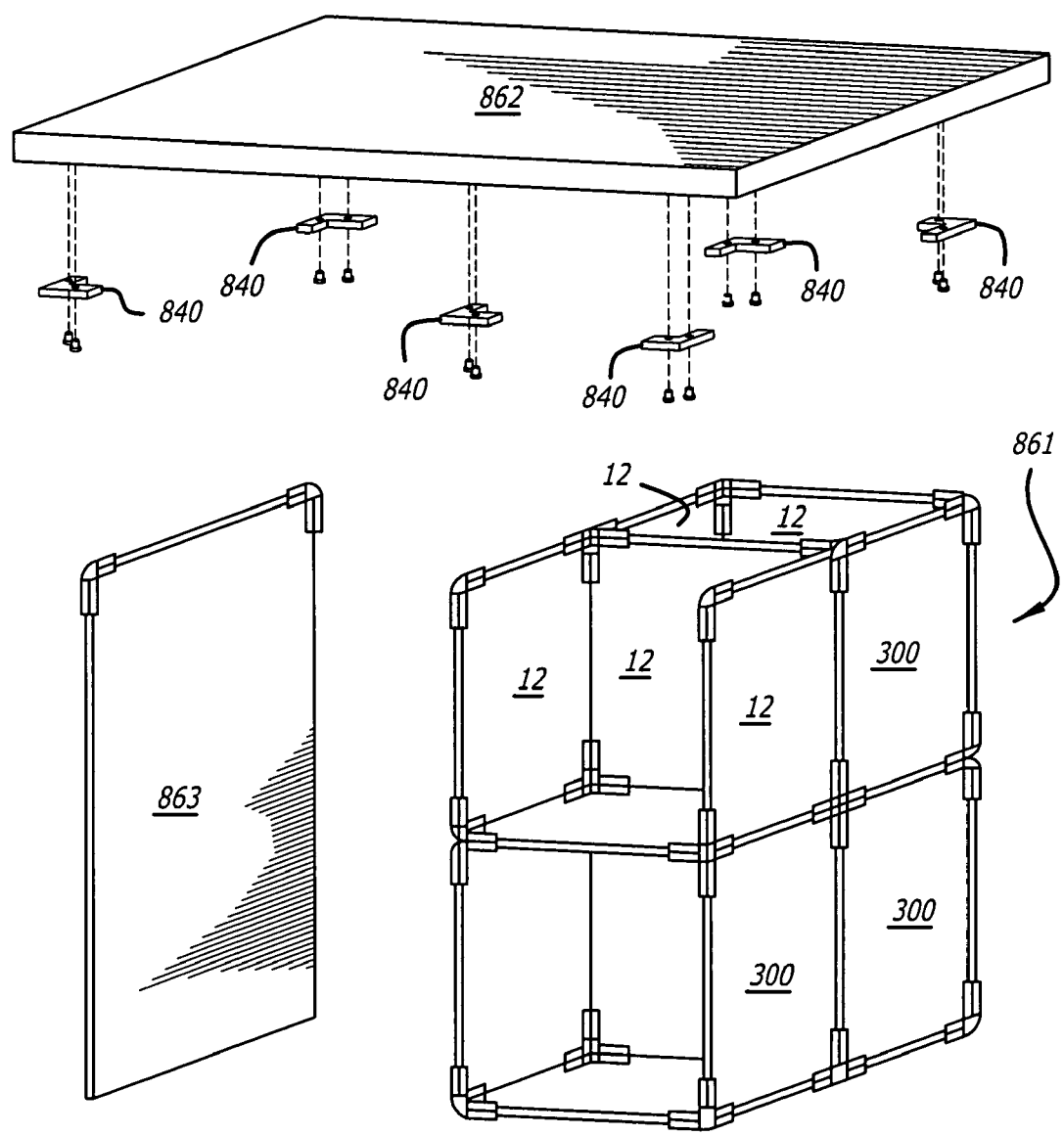
FIGS. 13A and 13B are views of a desk support formed from structural elements.
Figure 13B:
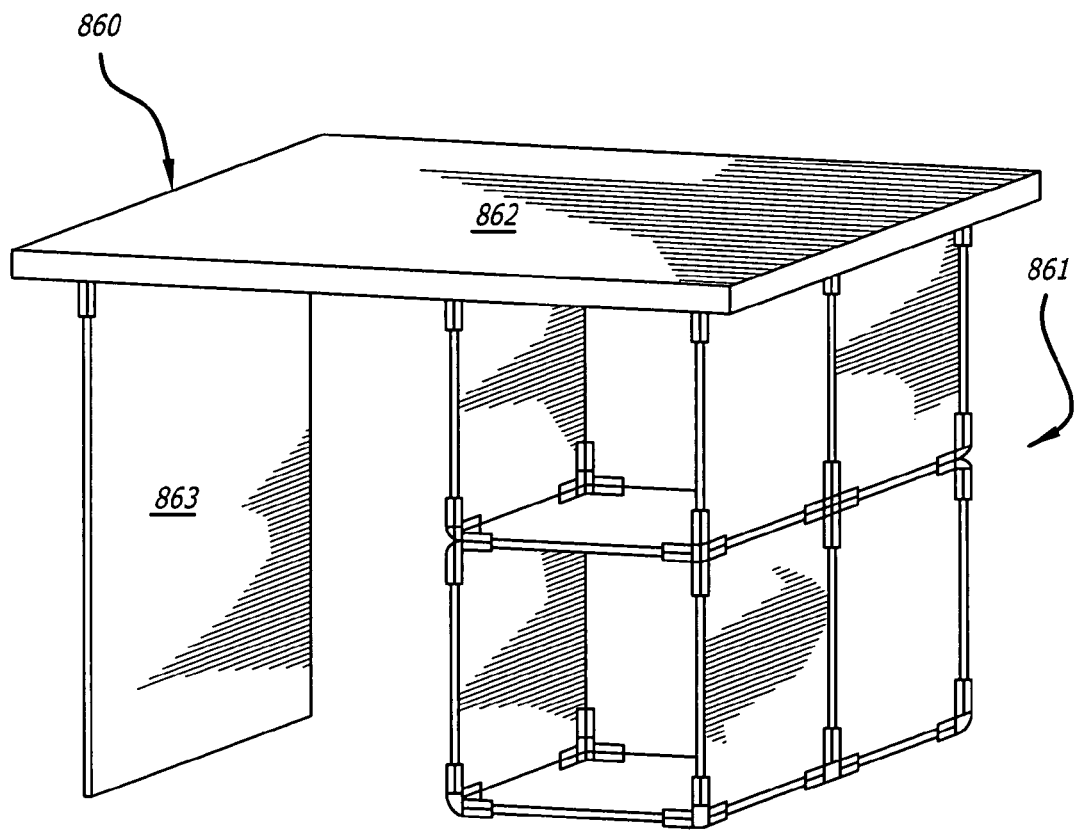

FIGS. 13A and 13B show an assembly and a perspective view of a desktop supported by an arrangement of structural elements, generally designated 860.

A series of cubes 300 and panels 12 are connected together to form a structural element 861 of a selected height. A desk top 862 is supported on top of the structural element at one end and by a support leg 863 at the other end. To inhibit the top from moving, through-mount corner covers 840 are mounted to the underside of the top and positioned to correspond to the location of corresponding latch/catch pairs 821/823. Door latch closures 855 may be substituted for one more of the through mount panel covers 840 and aligned with corner covers which included a receiving 843.

Figure 14:
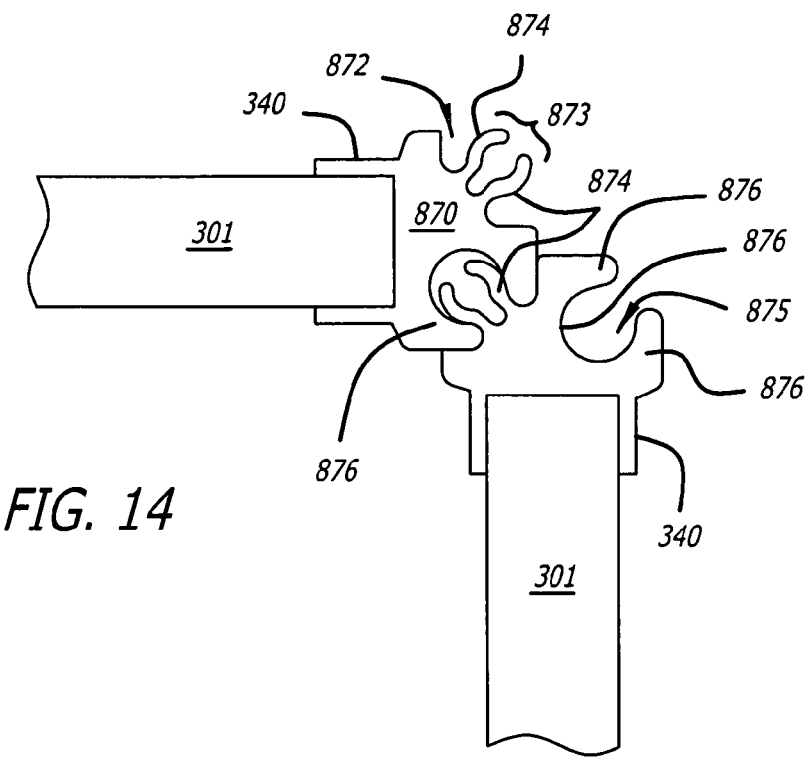
FIG. 14 is a cutaway side view of a deformable latch fixed within a latch.

In FIG. 14 there is shown a cut-away side view of a panel cover 870 with a collapsible latch 871. In this embodiment the tab projection 872 forming the latch is elongated and has an enlarged split head 873 constructed of two half heads 874 and 874'. The half heads 874 and 874' snap in a reversible fashion into the corresponding catches 875 slot walls 876. The enlarged split head 873 is deformable for entry into the catch 875. The catch slot walls 876 may be non-deformable or they may be deformable.

The latch/catch pairs 871/875 are preferably an injection molded part constructed out of a material which is flexible and durable to provide for the snap-in and snap-out attachment such as polypropylene, ABS, polycarbonate, high durometer rubber, or nylon and with sufficient lubricity so that affixed latch/catch pairs 871/875 may be snapped in (attached) and snapped out (detached) at least several times without interfering with attachment or detachment.

Figure 15:
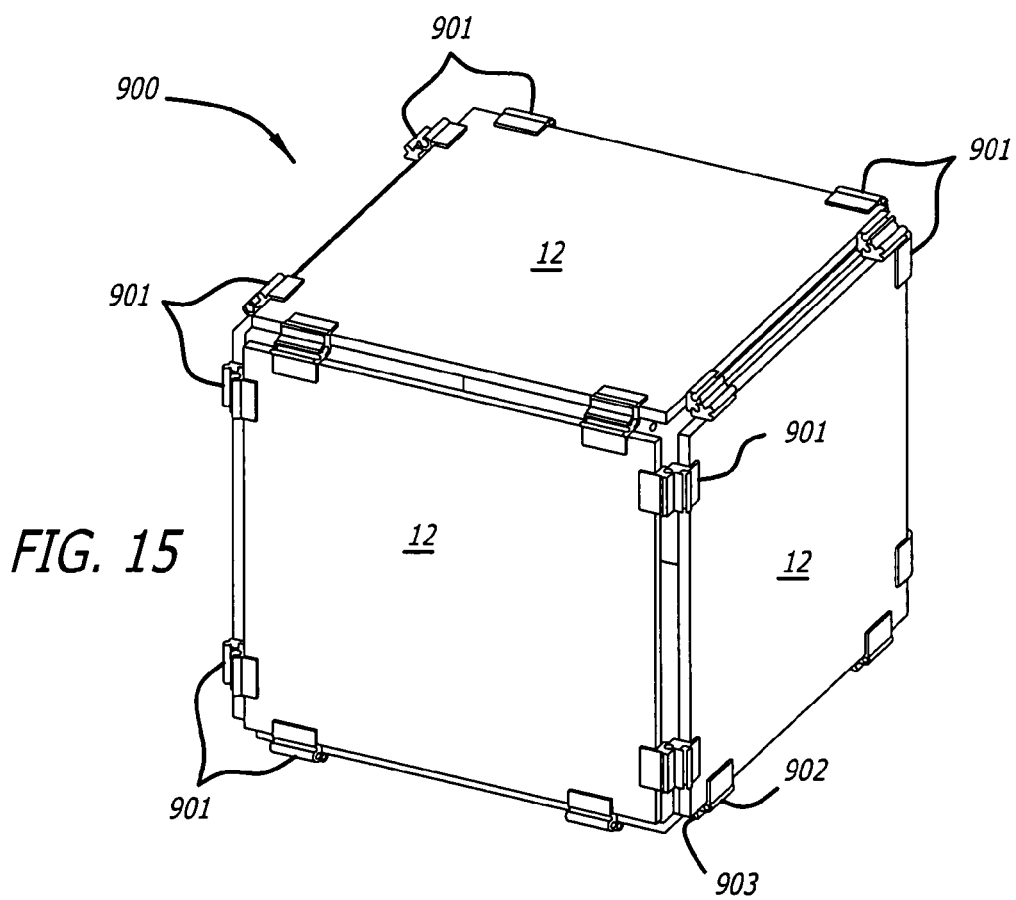
FIG. 15 is a perspective view of another snap together structure.

Shown in FIG. 15 is another snap together arrangement of panels 12. Panel covers 901 each with a latch/catch pair 902/903 supported thereon are shown affixed to panels 12.

Although the attachment is illustrated as a slide-on mount, other mounts such as snap-on or through mount may be used. Moreover, although the illustration shows panel covers 901, the latch/catch pairs 902/903 may also be formed as part of the panel.

The number of panel covers 901 and latch/catch pairs 902/903 indicated are not a limitation and fewer or greater numbers are within the scope of this invention.

Since certain changes may be made in the above apparatus without departing from the scope of the invention herein involved, it is intended that all matter contained in the above description, as shown in the accompanying drawing, shall be interpreted in an illustrative, and not a limiting sense.

What is claim is:

1. A snap together attachment system comprising:
a plurality of panels each with a front side and a back side and at least one edge, said front side defining a plane each front side having alternating catches with elongated, deformable slot walls having a length and latches with elongated, projecting enlarged heads having a length substantially similar as the length of the slot walls, each catch being substantially rigid and having adequate memory and elasticity to deform and snap back, wherein a pair of said catches and latches extend at a fixed angle relative to each other and outwardly along said at least one edge, said pair of said catches and latches also extend at an angle relative to said plane, and one of said catches is configured to snap into engagement with at least one latch of an adjacent panel, the latch and catch combination being firmly mated with each other, through which a structure can be constructed from, panels attached to other panels by snapping the enlarged head of one panel into a catch of another panel by displacing the deformable slot walls of the catch.

2. The system of claim 1 wherein each latch and catch extends at approximately a 45 degree angle from the panel.

3. The system of claim 1 further comprising at least one alignment stop on each edge whereby movement of attached panels along the length of the slot walls is inhibited.

4. The system of claim 1 further comprising a receiving catch formed on the edge of one or more of the panels through which a latch closure can mate.

5. The system of claim 4 further comprising: at least two hinges support from an edge of a panel; a movable door affixed on one side to the at least two hinges; and at least one latch closure affixed to the movable door in a location suitable for mating with the receiving catch.

6. The system of claim 1 wherein the panels are formed of a material selected from the group consisting of plastic, rubber, high durometer rubber, acrylonitrile-butadiene-styrene, acetal, acylic, nylon, polycarbonate, polypropylene and polyurethane.

7. The system or claim 1 wherein the panels are used to form structural elements to construct structures selected from the group consisting of racks, carts, desks, cubes, storage units, display centers and cabinets.

8. The system of claim 1 wherein the panels are used to form structures with at least two varying dimensional opposing wall pairs.

9. The system of claim 1 further comprising at least one latch or catch formed on the backside of at least one panel.

10. A snap together attachment system comprising;
at least one panel having an edge, a front side defining a plane, a back side, and means for attaching at least one panel cover to said panel; and
a panel cover with at least one latch and catch supported on the front side of the panel cover, wherein a pair of said catches and latches extend at a fixed angle relative to each other and outwardly along the edge, said pair of said catches and latches also extend at an angle relative to said plane,
said catch with elongated, deformable slot walls having a length and being substantially rigid and having adequate memory and elasticity to deform and snap back and said latch with a projecting, elongated, enlarged head,
wherein the elongated, enlarged head has a length which is substantially the same as the length of the slot walls, through which a structure can be constructed from panel covers attached to other panel covers by snapping the elongated, enlarged head of one panel cover into a catch of another panel cover by displacing the elongated deformable slot walls of the catch.

11. The system of claim 10 wherein each latch and catch extends at approximately a 45 degree angle from the panel.

12. The system of claim 10 further comprising at least one stop on each panel cover through which movement of an attached panel along the length of the slot walls is inhibited.

13. The system of claim 10 further comprising a receiving catch formed at one or more of the panel covers through which a latch closure can mate.

14. The system of claim 13 further comprising: at least two hinges support from an edge of a panel; a movable door affixed on one side to the at least two hinges; and at least one latch closure affixed to the movable door in a location suitable for mating with the receiving catch.

15. The system of claim 10 wherein the panel covers are formed of a material selected form the group consisting of plastic, rubber, high durometer rubber, acrylonitrile-butadiene-styrene, acetal, acylic, nylon, polycarbonate, polypropylene and polyurethane.

16. The system of claim 10 further comprising at least one latch or catch formed on the back side of at least one panel cover.

17. The system of claim 10 wherein the panel covers and panels are constructed of dissimilar materials.

18. The system of claim 10 further comprising a buttress formed on at least two panels, through which connection of panels with adjacent buttresses forms a larger panel support.

19. The system of claim 10 further comprising a buttress formed on an at least two panel covers, through which connection of panels with adjacent buttresses forms a larger panel support.

20. The system of claim 10 wherein the attaching means is a slide-on mount over a panel edge.

21. The system of claim 10 wherein the attaching means is a snap-on mounting catch over a panel edge.

22. The system of claim 10 wherein the attaching means comprises: a mounting plate, extending from the panel cover, with a through-mount attachment guide which fits over a side of the panel; and a fastener which extends through the panel and the through mount attachment guide.

23. The system of claim 10 wherein the attaching means comprises: a mounting plate, extending from the panel cover, with a through-mount attachment guide which fits into a support slot along an edge of the panel; and a fastener which extends through the panel and the through mount attachment guide.

24. The system of claim 10 wherein the attaching means comprises: a mounting plate, extending from the panel cover, with a glue mount attachment guide which fits into a support slot along an edge of the panel; and a glue or adhesive which cures within the support slot and glue mount attachment guides.

25. The system of claim 10 wherein the material to construct at least one of the panels is selected from one or more of the group consisting of framed wire mesh, coated wire, plastic grids, wood, metal, plastic, composites, sheet steel, stainless, hot rolled, stainless cold rolled, carbon steel, alloy, brass, or copper stamped, copper formed, woven metal, woven plastic and metal frames inserted molded into plastic.

26. The system of claim 10 wherein the attaching means is selected from the group consisting of adhesives, locking tabs, sonic welds, glue, rivets, fasteners and crimping.

* * * * *